US011984249B2

(12) United States Patent
Inoue et al.

(10) Patent No.: US 11,984,249 B2
(45) **Date of Patent: *May 14, 2024**

(54) GRAIN-ORIENTED ELECTRICAL STEEL SHEET, WOUND TRANSFORMER CORE USING THE SAME, AND METHOD FOR PRODUCING WOUND CORE

(71) Applicant: JFE STEEL CORPORATION, Tokyo (JP)

(72) Inventors: Hirotaka Inoue, Tokyo (JP); Seiji Okabe, Tokyo (JP); Takeshi Omura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 958 days.

This patent is subject to a terminal disclaimer.

(21) Appl. No.: 16/966,256

(22) PCT Filed: Jan. 31, 2019

(86) PCT No.: PCT/JP2019/003399
§ 371 (c)(1),
(2) Date: Jul. 30, 2020

(87) PCT Pub. No.: WO2019/151399
PCT Pub. Date: Aug. 8, 2019

(65) Prior Publication Data

US 2021/0043358 A1 Feb. 11, 2021

(30) Foreign Application Priority Data

Jan. 31, 2018 (JP) ................................ 2018-014244

(51) Int. Cl.
*H01F 27/245* (2006.01)
*H01F 1/147* (2006.01)
(Continued)

(52) U.S. Cl.
CPC .......... *H01F 27/245* (2013.01); *H01F 1/147* (2013.01); *H01F 1/16* (2013.01); *H01F 41/02* (2013.01);
(Continued)

(58) Field of Classification Search
None
See application file for complete search history.

(56) References Cited

U.S. PATENT DOCUMENTS 11,495,378 B2 * 11/2022 Inoue ..................... H01F 1/147
2017/0263357 A1 * 9/2017 Senda ..................... C22C 38/00
(Continued)

FOREIGN PATENT DOCUMENTS

CN 101395284 A 3/2009
CN 104284994 A 1/2015
(Continued)

OTHER PUBLICATIONS

Aug. 4, 2020 International Preliminary Report on Patentability issued in International Patent Application No. PCT/JP2019/003399.
(Continued)

*Primary Examiner* — Kevin M Bernatz
(74) *Attorney, Agent, or Firm* — Oliff PLC

(57) ABSTRACT

A grain-oriented electrical steel sheet for a wound transformer core. The steel sheet having a sheet thickness t, where t and an iron loss deterioration ratio obtained by subjecting the steel sheet under elliptic magnetization satisfy the following relations: (i) when t≤0.20 mm, the iron loss deterioration ratio is 60% or less; (ii) when 0.20 mm<t<0.27 mm, the iron loss deterioration ratio is 55% or less; and (iii) when 0.27 mm≤t, the iron loss deterioration ratio is 50% or less. The iron loss deterioration ratio is calculated from $((W_A-W_B)/W_B)\times100$, where $W_A$ is iron loss under 50 Hz elliptic magnetization of 1.7 T in a rolling direction and 0.6
(Continued)

(A) TRANSFER MAGNETIC FLUX + (B) INTERLAMINAR MAGNETIC FLUX +(C) MAGNETIC FLUX CROSSING Gaps = MAGNETIC FLUX HAVING REACHED JOINT PORTION
IN LAP PORTION, (B) INTERLAMINAR MAGNETIC FLUX = 1/2 x (A) TRANSFER MAGNETIC FLUX IN CONSIDERATION OF SYMMETRY OF MAGNETIC FLUX
(C) MAGNETIC FLUX CROSSING Gaps = MAGNETIC FLUX HAVING REACHED JOINT PORTION-3/2 x (A) TRANSFER MAGNETIC FLUX T in a direction orthogonal to the rolling direction, and $W_B$ is iron loss under 50 Hz alternating magnetization of 1.7 T in the rolling direction.

12 Claims, 7 Drawing Sheets

(51) Int. Cl.
*H01F 1/16* (2006.01)
*H01F 41/02* (2006.01)
(52) U.S. Cl.
CPC ........ *H01F 41/0233* (2013.01); *Y10T 428/32* (2015.01)

(56) References Cited

U.S. PATENT DOCUMENTS

| | | | | |
|---|---|---|---|---|
| 2020/0373046 | A1* | 11/2020 | Inoue | H01F 1/16 |
| 2023/0178276 | A1* | 6/2023 | Ichihara | C21D 8/1294 428/573 |

FOREIGN PATENT DOCUMENTS

| | | | |
|---|---|---|---|
| CN | 107109552 | A | 8/2017 |
| EP | 577124 | A2 | 1/1994 |
| EP | 589418 | A1 | 3/1994 |
| EP | 0892072 | A1 | 1/1999 |
| EP | 1 992 708 | A1 | 11/2008 |
| EP | 2615189 | A1 | 7/2013 |
| EP | 2 796 583 | A1 | 10/2014 |
| EP | 2 843 062 | A1 | 3/2015 |
| EP | 2 843 069 | A1 | 3/2015 |
| EP | 3 205 738 | A1 | 8/2017 |
| JP | S62-53579 | B2 | 11/1987 |
| JP | H0369968 | B2 | 11/1991 |
| JP | H03268311 | A | 11/1991 |
| JP | H06100997 | A | 4/1994 |
| JP | H06136552 | A | 5/1994 |
| JP | H06220541 | A | 8/1994 |
| JP | 2005-240079 | A | 9/2005 |
| JP | 2012-126973 | A | 7/2012 |
| JP | 5286292 | B2 | 9/2013 |
| JP | 5750820 | B2 | 7/2015 |
| KR | 20140103973 | A | 8/2014 |
| KR | 20140133599 | A | 11/2014 |

OTHER PUBLICATIONS

Yamaguchi, Hiroi et al. "3D Magnetic Flux Measurement in Joint Region of a Model Core Stacked with Grain-Oriented Electrical Steel." The Transactions of the Institute of Electrical Engineers of Japan, D, vol. 130, No. 9, pp. 1087-1093, 2010.
Enokizono, Masato, et al. "Two-Dimensional Vector Magnetic Property." The papers of technical on magnetics, Institute of Electrical Engineers of Japan, MAG-04-224, pp. 27-31, 2004.
Apr. 2, 2019 Written Opinion issued in International Patent Application No. PCT/JP2019/003399.
Jun. 29, 2021 Office Action issued in Canadian Patent Application No. 3,086,308.
Apr. 5, 2023 Office Action issued in European Patent Application No. 19 747 292.1.
Jan. 29, 2021 Extended European Search Report issued in European Patent Application No. 19747292.1.
Nov. 15, 2021 Notice of Allowance issued in Korean Patent Application No. 10-2020-7022134.
Dec. 17, 2021 Office Action issued in Chinese Patent Application No. 201980010739.1.
Mar. 9, 2022 Office Action issued in U.S. Appl. No. 16/966,268.

* cited by examiner

STACKED THICKNESS:22.5mm
STEEL SHEET WIDTH:100mm
7 STEP LAPS
SINGLE LAYER LAP LENGTH 2,4,6mm

FIG. 5

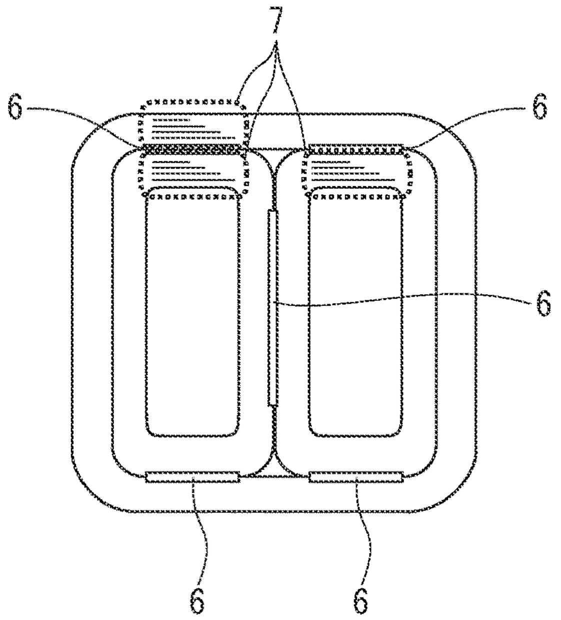

FIG. 6

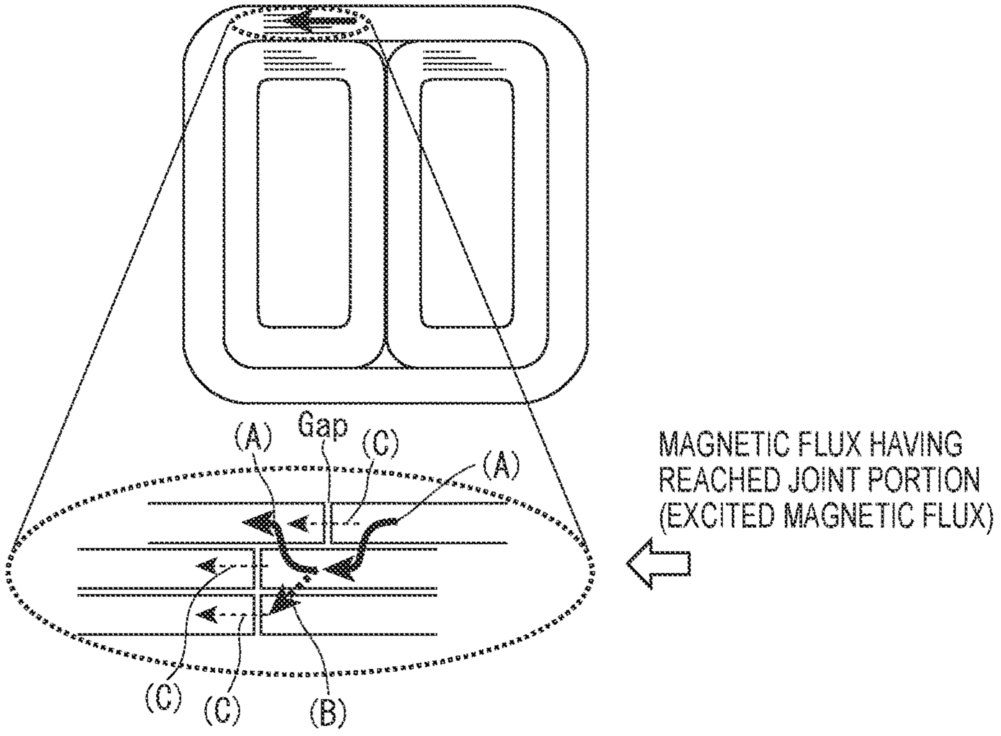

(A) TRANSFER MAGNETIC FLUX + (B) INTERLAMINAR MAGNETIC FLUX +(C) MAGNETIC FLUX CROSSING Gaps = MAGNETIC FLUX HAVING REACHED JOINT PORTION IN LAP PORTION, (B) INTERLAMINAR MAGNETIC FLUX = 1/2 x (A) TRANSFER MAGNETIC FLUX IN CONSIDERATION OF SYMMETRY OF MAGNETIC FLUX <u>(C) MAGNETIC FLUX CROSSING Gaps = MAGNETIC FLUX HAVING REACHED JOINT PORTION-3/2 x (A) TRANSFER MAGNETIC FLUX</u>

GRAIN-ORIENTED ELECTRICAL STEEL SHEET, WOUND TRANSFORMER CORE USING THE SAME, AND METHOD FOR PRODUCING WOUND CORE

TECHNICAL FIELD

This disclosure relates to a grain-oriented electrical steel sheet used for a wound core of a transformer, to a wound core of a transformer using the same, and a method for producing the wound core.

BACKGROUND

A grain-oriented electrical steel sheet having a crystal texture, in which the <001> orientation, an axis of easy magnetization of iron, are highly aligned with the rolling direction of the steel sheet, is used, in particular, as a core material of a power transformer. Transformers are broadly classified by their core structure into stacked core transformers and wound core transformers. The stacked core transformers have its core formed by stacking steel sheets sheared into a predetermined shape. The wound core transformers have its core formed by winding a steel sheet. The stacked core transformers, at present, are often used in large transformers. Although there are various features included in the transformer core, smaller iron loss is most desired.

From this point of view, important characteristics of a grain-oriented electrical steel sheet used as a core material include smaller iron loss. Further, in order to reduce cupper loss by reducing an excitation current in a transformer, it is necessary that magnetic flux density be high. The magnetic flux density is evaluated using the magnetic flux density B8 (T) at a magnetizing force of 800 A/m. Generally, the higher the degree of accumulation into the Goss orientation, the higher the B8. Generally, the hysteresis loss of an electrical steel sheet having a high magnetic flux density is small, and such an electrical steel sheet is excellent also in iron loss characteristics. To reduce the iron loss of a steel sheet, higher alignment of the crystal orientations of secondary recrystallized grains in the steel sheet with the Goss orientation and reduction of impurities in the steel composition are used. However, the control of crystal orientations and the reduction of impurities have limitations. Therefore, a technique for reducing iron loss by introducing non-uniformity to the surface of a steel sheet using a physical method to subdivide the widths of magnetic domains, i.e., a magnetic domain refining technique, has been developed. For example, Patent Literature 1 and Patent Literature 2 describe heat resistant-type magnetic domain refining methods in which linear grooves, having a predetermined depth, are formed on the surface of a steel sheet. Patent Literature 1 describes means for forming grooves using a gear-type roll. Patent Literature 2 describes means for forming grooves by pressing a knife edge against a steel sheet subjected to final finishing annealing. These means have an advantage in that their magnetic domain refining effect applied to the steel sheet does not disappear even after heat treatment and that they are applicable to wound cores etc.

To reduce transformer iron loss, it is generally contemplated to reduce the iron loss of the grain-oriented electrical steel sheets used as the core material (the material iron loss).

In a transformer core, particularly, a three-phase excitation wound core transformer having three-legged or five-legged grain-oriented electrical steel sheets, it is known that the iron loss in the transformer is larger compared to the material iron loss. A value obtained by dividing the iron loss value of a transformer using electrical steel sheets for the core of the transformer (transformer iron loss) by the iron loss value of the material obtained by the Epstein test is generally referred to as a building factor (BF) or a destruction factor (DF). Specifically, in a three-leg or five-legged three-phase excitation wound core transformer, the BF is generally larger than 1.

It has been pointed out as a general knowledge that one main cause that the value of transformer iron loss of a wound transformer is larger than the value of the material iron loss is concentration of magnetic flux on inner wound cores that is caused by the difference in magnetic path length. As shown in FIG. 1, exciting the inner wound cores 1 and an outer wound core 2 simultaneously, the magnetic flux is concentrated on the inner wound cores 1 because the magnetic path length of the inner wound cores 1 is shorter compared to that of the outer wound core 2, and therefore the iron loss of the inner wound cores 1 increases. In particular, when excitation magnetic flux density is relatively small, the effect of the magnetic path length is large, and therefore the increase in iron loss due to concentration of magnetic flux is large. When the excitation magnetic flux density increases, the excitation cannot be borne only by the inner wound cores 1, and more magnetic flux passes through the outer wound core 2, so that the concentration of the magnetic flux is reduced. However, as shown in FIG. 2, the magnetic flux passing though the outer wound core 2 transfer into the inner wound cores 1, and interlaminar magnetic flux transfer 3 occurs between the inner wound cores 1 and the outer wound core 2. By the occurrence of magnetization in an in-plane direction, in-plane eddy current loss increases, causing interlaminar magnetic flux transfer 3, and the iron loss increases.

In the transformer core, since the coils are inserted, a joint portion (lap portion 4) in which steel sheets are lap-jointed exists as shown in FIG. 3. In the lap portion 4, a complicated magnetization behavior occurs, i.e., for example, the magnetic flux transfer in a direction perpendicular to the steel sheet surface, and therefore the magnetic resistance increases. The occurrence of magnetization in an in-plane direction causes an increase in in-plane eddy current loss.

Based on the qualitative understanding of the causes of the increase in the transformer iron loss, the following approaches, for example, have been made to reduce the transformer iron loss.

Patent Literature 3 discloses a technique for effectively reducing transformer iron loss. Specifically, an electrical steel sheet having poorer magnetic properties than an electrical steel sheet on an outer side is arranged on an inner side on which a magnetic path length is shorter and magnetic resistance is smaller, and the electrical steel sheet arranged on the outer side on which the magnetic path length is longer and the magnetic resistance is larger has better magnetic properties than the electrical steel sheet on the inner side. Patent Literature 4 discloses a technique for effectively reducing transformer noise. Specifically, a wound core produced by winding a grain-oriented silicon steel sheet is arranged on an inner side, and a magnetic material with lower magnetostriction than such grain-oriented silicon steel sheet is externally wound around the wound core to form a combined core.

CITATION LIST

Patent Literature

PTL 1: Japanese Examined Patent Application Publication No. 62-53579

PTL 2: Japanese Examined Patent Application Publication No. 3-69968

PTL 3: Japanese Patent No. 5286292

PTL 4: Japanese Unexamined Patent Application Publication No. 3-268311

PTL 5: Japanese Patent No. 5750820

Non-Patent Literature

NPL 1: The transactions of the Institute of Electrical Engineers of Japan. D, Vol. 130, No. 9, P1087-1093 (2010)

NPL 2: The papers of technical meeting on magnetics, Institute of Electrical Engineers of Japan, MAG-04-224, P27-31 (2004)

SUMMARY

Technical Problem

As disclosed in Patent Literature 3 and Patent Literature 4, the transformer characteristics can be efficiently improved by utilizing concentration of magnetic flux on the inner wound core and forming the inner wound core and the outer wound core using different materials. However, as described above, as the excitation magnetic flux density increases, the concentration of the magnetic flux is reduced, so that the effect of improving the transformer characteristics is reduced. Moreover, in these methods, since it is necessary to arrange different materials appropriately, the transformer manufacturability deteriorates significantly.

An object of the disclosure is to provide a grain-oriented electrical steel sheet that exhibits an excellent transformer iron loss reducing effect when used for a wound core of a transformer. Another object of the disclosure is to provide a wound core of a transformer that uses such grain-oriented electrical steel sheet and a method for producing such wound core.

Solution to Problem

The present inventors examined interlaminar transfer between an outer wound core and inner wound cores, the magnetic resistance of joint portions, and an increase in iron loss of a transformer.

Grain-oriented electrical steel sheets having a magnetic flux density B8 of 1.93 T at a magnetizing force of 800 A/m and a thickness of 0.20 mm, 0.23 mm, or 0.27 mm were used to produce transformer cores having a wound core shape shown in FIG. 4 and having different lap joint lengths from 2 to 6 mm. Each of the transformer cores was subjected to three-phase excitation at 50 Hz and 1.7 T to measure iron loss. The wound core in FIG. 4 has a shape with a stacked thickness of 22.5 mm, a steel sheet width of 100 mm, seven step laps, and a single layer lap length (2, 4, or 6 mm). At the same time, as disclosed in Patent literature 5, local iron loss was measured, by measuring the increase in temperature of an end surface of the core during excitation using an infrared camera. Then the iron loss was found to be particularly large in interlaminar transfer portions 6 between the outer wound core and the inner wound cores and lap joint portions 7 shown in FIG. 5. Table 1 shows the values of the overall transformer iron loss, the average iron loss of the interlaminar transfer portions and the average iron loss of the lap joint portions, for each transformer core.

TABLE 1

| Core production conditions | | | Material | Transformer | | Iron loss of interlaminar transfer | Iron loss of lap joint |
|---|---|---|---|---|---|---|---|
| Condition | Sheet thickness | Lap joint length | iron loss (W/kg) | iron loss (W/kg) | BF | portions (W/kg) | portions (W/kg) |
| 1 | 0.20 mm | 2 mm | 0.78 | 1.06 | 1.36 | 1.68 | 1.35 |
| 2 | 0.20 mm | 4 mm | 0.78 | 1.03 | 1.32 | 1.66 | 1.31 |
| 3 | 0.20 mm | 6 mm | 0.78 | 1.00 | 1.28 | 1.62 | 1.28 |
| 4 | 0.23 mm | 2 mm | 0.82 | 1.16 | 1.41 | 1.83 | 1.43 |
| 5 | 0.23 mm | 4 mm | 0.82 | 1.11 | 1.35 | 1.80 | 1.39 |
| 6 | 0.23 mm | 6 mm | 0.82 | 1.09 | 1.33 | 1.77 | 1.37 |
| 7 | 0.27 mm | 2 mm | 0.88 | 1.27 | 1.44 | 1.88 | 1.47 |
| 8 | 0.27 mm | 4 mm | 0.88 | 1.24 | 1.41 | 1.85 | 1.43 |
| 9 | 0.27 mm | 6 mm | 0.88 | 1.22 | 1.39 | 1.84 | 1.40 |

The transformer iron loss and the BF (=the transformer iron loss/the material iron loss) increase as the lap joint length decreases and the sheet thickness increases. Further, the average iron loss of the interlaminar transfer portions and the average iron loss of the lap joint portions increase as the lap joint length decreases and the sheet thickness increases. It is therefore inferred that the iron loss of the interlaminar transfer portions and the iron loss of the lap joint portions are significant factors that determine the magnitude of the transformer iron loss. Thus, It is therefore important to consider what factor determines the magnitude of the iron loss of the interlaminar transfer portions and the magnitude of the iron loss of the lap joint portions.

It is inferred that, from the viewpoint of transfer of magnetic flux in lap portions, the iron loss of the lap joint portions varies due to the following causes. Non-Patent Literature 1 is a document relating to transfer magnetic flux in core joint laps. FIG. 6 schematically shows the flows of magnetic flux in a joint portion that are estimated based on the findings in this document. On the assumption that no magnetic flux leaks to the outside of the steel sheets, the magnetic flux reaching the joint portion can be divided into (A) transfer magnetic flux (that transfers lap portions in an out-of-plane direction), (B) interlaminar magnetic flux (that transfer spaces between stacked steel sheets in portions other than the lap portions), and (C) magnetic flux crossing Gaps (between steel sheets) (In FIG. 6, the magnetic flux that has reached the joint portion=(A) the transfer magnetic flux+(B)

the interlaminar magnetic flux+(C) the magnetic flux crossing the Gaps). As the lap joint length decreases, the area of the lap portions decreases, so that (A) the transfer magnetic flux decreases. Similarly, as the sheet thickness increases, the number of stacked sheets at a given stacking height in the core decreases, and the area of the lap portions relative to the volume of the joint portion decreases accordingly, so that (A) the transfer magnetic flux decrease. In a step lap joint, (B) the interlaminar magnetic flux is about one half of (A) the transfer magnetic flux because of the symmetry of (B) the interlaminar magnetic flux (in a lap joint, in consideration of the symmetry of the magnetic flux, (B) the interlaminar magnetic flux=(A) the transfer magnetic flux×½, and (C) the magnetic flux crossing the Gaps=the magnetic flux that has reached the joint portion−(A) the transfer magnetic flux×3/2). Therefore, as the lap joint length decreases or as the sheet thickness increases, (A) the transfer magnetic flux decreases, and (C) the magnetic flux crossing the Gaps increase inevitably. It is inferred from the flows of the magnetic flux in the joint portion that an increase in (C) the magnetic flux crossing the Gaps resulted in an increase in the iron loss of the lap joint portion.

From the viewpoint of the magnetic resistance of the joint portion, the above correlation may be due to the following reasons. The width of the Gap portions is generally larger compared to that of the gaps between steel sheets in the stacking direction (≅the thickness of surface coatings on the electrical steel sheets (about several micrometers)), but this depends on the accuracy of assembly. The magnetic resistance for (C) the magnetic flux crossing the Gaps may be larger compared to the magnetic resistance for (A) the transfer magnetic flux and the magnetic resistance for (B) the interlaminar magnetic flux. Therefore, as the magnetic flux density crossing the Gaps increases, the magnetic resistance of the joint portion may increase. The increase in the magnetic resistance of the joint portion may directly cause the iron loss of the joint portion to increase.

Further, it is inferred that the magnetic resistance of the joint portion is a significant factor in the increase in the iron loss of the interlaminar transfer portions. As the magnetic flux density excited in the joint portion increases, (C) the magnetic flux crossing the Gaps increases because (A) the transfer magnetic flux cannot increase beyond a certain level. Therefore, the magnetic resistance of the joint portion increases. To avoid this, interlaminar magnetic flux transfer between the outer wound core and the inner wound cores increases in order to avoid the concentration of the magnetic flux on the inner wound cores and to transfer magnetic flux on the outer wound core. In a wound core in which (C) the magnetic flux crossing the Gaps is large and which has a smaller lap joint length and a greater sheet thickness, in order to reduce (C) the magnetic flux crossing the Gaps as much as possible, the interlaminar magnetic flux transfer between the outer wound core and the inner wound cores is increased to reduce concentration of the magnetic flux on the inner wound cores, so that the magnetic flux density excited in the joint portion is reduced. It is inferred that an increase in the interlaminar magnetic flux transfer causes an increase in in-plane eddy current loss, causing an increase in the iron loss of the interlaminar transfer portions.

Based on the above experimental facts and inferences, it was found that to reduce the transformer iron loss and the BF in a wound transformer, it is desirable to reduce the magnetic flux density crossing the Gaps. Further, to reduce the magnetic flux density crossing the Gaps, it may be desirable to increase the amount of the magnetic flux which transfer in the lap portions. One method to increase the amount of the magnetic flux which transfers in the lap portions is to change the design of the transformer core such that the lap length is increased to increase the area of the lap portions. Another method is to reduce the sheet thickness to increase the number of lap regions to thereby increase the area of the lap portions per unit volume of the joint portions or to use a material having a large permeability for the magnetic flux transfer in the lap portions. In the disclosure, to produce a transformer having excellent iron loss characteristics irrespective of the design of the transformer core, a search was conducted for a material that allows the permeability for the magnetic flux transfer in the lap portions to increase when the material is formed into the transformer core considering the effect of the sheet thickness.

The relation between the magnetic flux density which transfer in the lap portions of the joint portions and material magnetic properties for various materials was investigated. In the investigation, as in the experiment described above, transformer cores having the design in FIG. 4 (lap length: 4 mm) were produced using different grain-oriented electrical steel sheets, and the iron loss of the joint lap portions was examined. The smaller the iron loss of the joint lap portions, the smaller the magnetic flux density crossing the Gaps, and the larger the magnetic flux density which transfer in the laps. Further, the Epstein test and an SST test (a single sheet magnetic property test for electrical steel sheets) were used for evaluation under uniaxial magnetization of a grain-oriented electrical steel sheet in its rolling direction, i.e., the easy magnetization direction. In addition, evaluation under biaxial magnetization was performed using a two-dimensional magnetic measurement device shown in Non-Patent Literature 2, and the correlation between the magnetic properties and the iron loss of the joint lap portions was examined under various excitation conditions. Then strong correlation was found between an iron loss deterioration ratio obtained by subjecting grain-oriented electrical steel sheets used as a material under elliptic magnetization defined by formula (1) below and the magnetic flux density transferred in the lap portions of a transformer core produced using such grain-oriented electrical steel sheets.

$$\text{(Iron loss deterioration ratio under elliptic magnetization)}=((W_A-W_B)/W_B)\times 100 \quad (1)$$

Here, $W_A$ in formula (1) is the iron loss under 50 Hz elliptic magnetization of 1.7 T in an RD direction (rolling direction) and 0.6 T in a TD direction (a direction orthogonal to the rolling direction), and $W_B$ is the iron loss under 50 Hz alternating magnetization of 1.7 T in the RD direction.

As for the grain-oriented electrical steel sheets (materials), FIG. 7 shows the results for a 0.18 mm-thick material, FIG. 8 shows the results for a 0.20 mm-thick material, FIG. 9 shows the results for a 0.23 mm-thick material, FIG. 10 shows the results for a 0.27 mm-thick material, and FIG. 11 shows the results for a 0.30 mm-thick material. At any thickness, as the iron loss deterioration ratio when the grain-oriented electrical steel sheets forming the core were subjected to elliptic magnetization increased, the iron loss of the interlaminar transfer portions increased. In particular, in the 0.18 mm-thick material and the 0.20 mm-thick material, when the iron loss deterioration ratio under the elliptic magnetization was more than 60%, the increase in the iron loss of the interlaminar transfer portions was significant. In the 0.23 mm-thick material, when the iron loss deterioration ratio was more than 55%, the increase in the iron loss of the interlaminar transfer portions was significant. In the 0.27 mm-thick material and the 0.30 mm-thick material, when the iron loss deterioration ratio was more than 50%, the increase in the iron loss of the interlaminar transfer portions was significant. As described above, it is inferred that, when the iron loss of the interlaminar transfer portions increases, the magnetic flux transfer in the lap portions decreases, and this is disadvantageous for the transformer iron loss.

Although the reason for the correlation between the iron loss deterioration ratio under the elliptic magnetization and the magnetic flux transfer at the lap portions is unclear, the present inventors contemplate that the reason is as follows. When magnetic flux transfers steel sheets in an out-of-plane direction, magnetic poles are formed at the interfaces between the steel sheets, and this causes a very large increase in magnetostatic energy. Then the magnetization state is changed such that a demagnetizing field is generated in an out-of-plane direction in order to reduce the magnetostatic energy. Specifically, it is inferred that an increase in the number of lancet domain structures in the steel sheets, generation of a demagnetizing field at crystal grain boundaries, etc. occur. For a magnetic domain refined material, it is inferred that an increase in the number of closure domains induced in strain-introduced portions occur. The change in the magnetization state may cause the magnetic flux density which transfer in the lap portions to decrease. Under elliptic magnetization in an in-plane direction, the magnetization direction is momentarily oriented in a <111> direction, which is a hard magnetization direction. Exciting under large elliptic magnetization such as 1.7 T in the RD direction and 0.6 T in the TD direction, magnetic anisotropy energy becomes very large at the moment when the magnetization direction of main magnetic domains rotates in a steel sheet plane from the easy magnetization direction to the hard magnetization direction, and therefore the magnetization state is changed such that a demagnetizing field is generated so as to reduce the magnetic anisotropy energy. In this case, as in the case of the transfer magnetic flux in an out-of-plane direction, the number of lancet domain structures in the steel sheets increases, and a demagnetizing field is generated at crystal grain boundaries. In a magnetic domain refined material, the number of closure domains induced in strain-introduced portions increases. Therefore, the iron loss under elliptic magnetization increases more significantly compared to the iron loss under alternating magnetization only in the easy magnetization direction. Specifically, it is inferred that the iron loss deterioration ratio under elliptic magnetization is correlated with a change in the magnetic flux density which transfer in the lap portions because of the same change factor, i.e., the generation of the demagnetizing field.

It is contemplated from the above inference that the magnitude of the magnetic flux density which transfer in the lap portions or the magnitude of the iron loss under elliptic magnetization can be estimated by parameterizing factors such as an increase in the number of lancet domain structures in the steel sheets, the generation of a demagnetizing field at the crystal grain boundaries, and, in a heat resistant-type magnetic domain refined material prepared by formation of grooves, an increase in leakage magnetic flux in groove-formed portions. Specifically, (i) A parameter indicating the amount of lancet domain structures in the steel sheets: Sin β

β: average β angle (°) of secondary recrystallized grains

As the average β angle of the secondary recrystallized grains increases, the magnetostatic energy increases in proportion to Sin β, and the amount of the lancet domain structures may increase to reduce the magnetostatic energy.

(ii) Generation of demagnetizing field at crystal grain boundaries: 4t/R t: steel sheet thickness (mm)

R: diameter of secondary recrystallized grains (mm)

The demagnetizing field generated at the grain boundaries may increase according to the grain boundary area ratio per unit area of steel sheet surface 4t/R.

(iii) Increase in leakage magnetic flux in groove-formed portions: $(w/a/\sqrt{2})\times(10d/t)\times10^{-3}$ a: spacing (mm) between a plurality of linear grooves extending in a direction intersecting the rolling direction w: width (μm) of the grooves in the rolling direction d: depth (mm) of the grooves The area of the groove-formed portions per unit area of the steel sheets surface is $(w/a)\times10^{-3}$. The leakage magnetic flux may increase depending on the groove depth relative to the sheet thickness d/t.

A parameter obtained by summing the three factors, $\sin\beta+4t/R+(w/a/\sqrt{2})\times(10d/t)\times10^{-3}$, was used to classify the iron loss deterioration ratios of materials under elliptic magnetization. These materials have thicknesses of 0.18 mm to 0.30 mm and various different material factors. The material factors and the measurement results are summarized in Table 2, and the relation between a parameter $[\sin\beta+4t/R+(w/a/\sqrt{2})\times(10d/t)\times10^{-3}]$ disclosed herein and the iron loss deterioration ratio is summarized in FIG. 12. As shown in FIG. 12, as the disclosed parameter increases, the iron loss deterioration ratio under elliptic magnetization decreases. Further, it was found that the magnetic flux density which transfers in the lap portions decreases at any sheet thickness and that, to satisfy an iron loss deterioration ratio range in which the iron loss of the joint lap portions is small, the disclosed parameter is 0.080 or more.

In a wound core using a material which has a large magnetic flux density B8 at a magnetizing force of 800 A/m, i.e., in which the degree of accumulation into the Goss orientation is high, even when the magnetic properties of the material are satisfactory, the magnetic properties of the transformer itself may rather deteriorate. In particular, in a wound core that uses grain-oriented electrical steel sheets in which the B8 is 1.91 T or more and the degree of accumulation into the Goss orientation is very high, the high permeability causes excessive concentration of the magnetic flux on the inner circumferential side, and this may result in the increase of the BF.

Further, in a material which has a large B8 and in which the degree of accumulation into the Goss orientation is very high, the secondary recrystallized grains tend to be coarse, and the diameter R of the secondary recrystallized grains can be as large as 40 mm or more. In this case, the demagnetizing field generated at the crystal grain boundaries is small, and the iron loss deterioration ratio under elliptic magnetization is large as described above, so that the BF increases.

However, by controlling the disclosed parameter within the range of 0.080 or more, the BF can be reduced even when the B8 is 1.91 T or more and the diameter R of the secondary recrystallized grains is 40 mm or more. Therefore, by controlling the B8 to 1.91 T or more, the diameter R of the secondary recrystallized grains to 40 mm or more, and the disclosed parameter within the range of 0.080 or more, grain-oriented electrical steel sheets in which the magnetic property (iron loss) of the material is very small, which allow the BF to be small, and which can form a transformer with very small iron loss can be provided.

TABLE 2

| Condition | β: Average β angle of secondary recrystallized grains (°) | t: Steel sheet thickness (mm) | R: Secondary recrystallized grain diameter (mm) | a: Spacing between a plurality of linear grooves extending in direction intersecting rolling direction (mm) | w: Width of grooves in rolling direction (μm) | d: Depth of grooves (mm) | Disclosed parameter*[1] | $W_B$*[2] (W/kg) | $W_A$*[3] (W/kg) | Iron loss deterioration ratio*[4] (%) |
|---|---|---|---|---|---|---|---|---|---|---|
| 1 | 2.5 | 0.18 | 21 | 3 | 200 | 0.023 | 0.138 | 0.66 | 0.94 | 42 |
| 2 | 2.4 | 0.18 | 22 | 4 | 200 | 0.022 | 0.118 | 0.67 | 0.96 | 43 |
| 3 | 2.5 | 0.18 | 23 | 4 | 180 | 0.018 | 0.107 | 0.65 | 0.97 | 49 |
| 4 | 2.4 | 0.18 | 21 | 5 | 150 | 0.015 | 0.094 | 0.64 | 0.96 | 50 |
| 5 | 2.3 | 0.18 | 22 | 6 | 150 | 0.014 | 0.087 | 0.68 | 1.03 | 51 |
| 6 | 2.2 | 0.18 | 23 | 5 | 120 | 0.015 | 0.084 | 0.68 | 1.04 | 53 |
| 7 | 2.5 | 0.18 | 25 | 5 | 100 | 0.014 | 0.083 | 0.69 | 1.07 | 55 |
| 8 | 2.4 | 0.18 | 24 | 5 | 80 | 0.015 | 0.081 | 0.68 | 1.08 | 59 |
| 9 | 2.1 | 0.18 | 26 | 5 | 80 | 0.015 | 0.074 | 0.67 | 1.09 | 63 |
| 10 | 1.8 | 0.18 | 28 | 5 | 50 | 0.015 | 0.063 | 0.67 | 1.12 | 67 |
| 11 | 2.5 | 0.20 | 18 | 3 | 180 | 0.022 | 0.135 | 0.69 | 0.96 | 39 |
| 12 | 2.4 | 0.20 | 17 | 3 | 180 | 0.020 | 0.131 | 0.70 | 0.99 | 41 |
| 13 | 2.2 | 0.20 | 16 | 3 | 160 | 0.019 | 0.124 | 0.71 | 1.01 | 42 |
| 14 | 2.3 | 0.20 | 20 | 4 | 140 | 0.023 | 0.109 | 0.71 | 1.02 | 44 |
| 15 | 2.1 | 0.20 | 19 | 4 | 120 | 0.020 | 0.100 | 0.71 | 1.03 | 45 |
| 16 | 2.2 | 0.20 | 21 | 4 | 120 | 0.015 | 0.092 | 0.70 | 1.05 | 50 |
| 17 | 2.3 | 0.20 | 22 | 5 | 100 | 0.017 | 0.089 | 0.70 | 1.07 | 53 |
| 18 | 2.0 | 0.20 | 20 | 5 | 80 | 0.015 | 0.083 | 0.71 | 1.12 | 58 |
| 19 | 1.9 | 0.20 | 22 | 5 | 70 | 0.015 | 0.077 | 0.71 | 1.14 | 61 |
| 20 | 1.8 | 0.20 | 25 | 5 | 70 | 0.015 | 0.071 | 0.71 | 1.18 | 66 |
| 21 | 2.5 | 0.23 | 17 | 4 | 180 | 0.025 | 0.132 | 0.72 | 0.97 | 35 |
| 22 | 2.3 | 0.23 | 21 | 4 | 150 | 0.025 | 0.113 | 0.73 | 1.05 | 44 |
| 23 | 2.4 | 0.23 | 19 | 4 | 150 | 0.018 | 0.111 | 0.74 | 1.06 | 43 |
| 24 | 2.2 | 0.23 | 18 | 4 | 120 | 0.020 | 0.108 | 0.73 | 1.08 | 48 |
| 25 | 2.5 | 0.23 | 20 | 4 | 120 | 0.018 | 0.106 | 0.73 | 1.09 | 49 |
| 26 | 2.6 | 0.23 | 21 | 4 | 100 | 0.020 | 0.105 | 0.75 | 1.12 | 49 |
| 27 | 2.1 | 0.23 | 25 | 3 | 80 | 0.025 | 0.094 | 0.73 | 1.11 | 52 |
| 28 | 1.9 | 0.23 | 26 | 3 | 80 | 0.018 | 0.083 | 0.73 | 1.12 | 53 |
| 29 | 1.7 | 0.23 | 26 | 3 | 80 | 0.017 | 0.079 | 0.72 | 1.14 | 58 |
| 30 | 1.7 | 0.23 | 28 | 3 | 80 | 0.018 | 0.077 | 0.72 | 1.16 | 61 |
| 31 | 2.4 | 0.27 | 18 | 4 | 150 | 0.025 | 0.126 | 0.81 | 1.06 | 31 |
| 32 | 2.2 | 0.27 | 23 | 4 | 120 | 0.025 | 0.105 | 0.80 | 1.09 | 36 |
| 33 | 2.1 | 0.27 | 21 | 4 | 120 | 0.018 | 0.102 | 0.81 | 1.12 | 38 |
| 34 | 2.3 | 0.27 | 25 | 4 | 100 | 0.020 | 0.096 | 0.81 | 1.14 | 41 |
| 35 | 2.3 | 0.27 | 26 | 4 | 100 | 0.018 | 0.093 | 0.82 | 1.16 | 41 |
| 36 | 2.1 | 0.27 | 24 | 4 | 80 | 0.020 | 0.092 | 0.82 | 1.18 | 44 |
| 37 | 1.8 | 0.27 | 28 | 3 | 80 | 0.025 | 0.087 | 0.80 | 1.18 | 48 |
| 38 | 1.6 | 0.27 | 25 | 3 | 80 | 0.018 | 0.084 | 0.80 | 1.19 | 49 |
| 39 | 1.9 | 0.27 | 28 | 5 | 60 | 0.017 | 0.077 | 0.82 | 1.24 | 51 |
| 40 | 1.7 | 0.27 | 27 | 5 | 60 | 0.018 | 0.075 | 0.82 | 1.26 | 54 |
| 41 | 2.2 | 0.30 | 17 | 4 | 200 | 0.028 | 0.142 | 0.91 | 1.19 | 31 |
| 42 | 2.1 | 0.30 | 18 | 3 | 180 | 0.025 | 0.139 | 0.93 | 1.23 | 32 |
| 43 | 1.9 | 0.30 | 16 | 4 | 180 | 0.026 | 0.136 | 0.93 | 1.24 | 33 |
| 44 | 2.3 | 0.30 | 21 | 4 | 150 | 0.027 | 0.121 | 0.92 | 1.27 | 38 |
| 45 | 2.2 | 0.30 | 24 | 4 | 150 | 0.022 | 0.108 | 0.92 | 1.29 | 40 |
| 46 | 2.0 | 0.30 | 32 | 4 | 120 | 0.025 | 0.090 | 0.90 | 1.30 | 44 |
| 47 | 1.6 | 0.30 | 27 | 3 | 100 | 0.021 | 0.089 | 0.89 | 1.31 | 47 |
| 48 | 1.6 | 0.30 | 31 | 3 | 80 | 0.024 | 0.082 | 0.89 | 1.32 | 48 |
| 49 | 1.9 | 0.30 | 36 | 5 | 80 | 0.025 | 0.076 | 0.91 | 1.38 | 52 |
| 50 | 1.8 | 0.30 | 38 | 6 | 80 | 0.025 | 0.071 | 0.94 | 1.45 | 54 |

*[1] $\sin\beta + 4t/R + (w/a/\sqrt{2}) \times (10d/t) \times 10^{-3}$: underlines indicate that the disclosed parameter is not satisfied.

*[2] Iron loss under 50 Hz alternating magnetization of 1.7 T in RD direction

*[3] Iron loss under 50 Hz elliptic magnetization of 1.7 T in RD direction and 0.6 T in TD direction

*[4] $((W_A - W_B)/W_B) \times 100$ Iron loss deterioration ratio under elliptic magnetization: underlined values are outside the range of the disclosure.

The disclosure has been completed based on the above findings. Specifically, the disclosed embodiments have the following structures.

[1] A grain-oriented electrical steel sheet used for a wound core of a transformer, wherein a sheet thickness t of the steel sheet and an iron loss deterioration ratio obtained by subjecting the steel sheet under elliptic magnetization defined by formula (1) below satisfy the following relations:

when the sheet thickness t≤0.20 mm, the iron loss deterioration ratio is 60% or less;

when 0.20 mm<the sheet thickness t<0.27 mm, the iron loss deterioration ratio is 55% or less; and when 0.27 mm≤the sheet thickness t, the iron loss deterioration ratio is 50% or less, and wherein (the iron loss deterioration ratio under the elliptic magnetization)$=((W_A-W_B)/W_B)\times 100$, (1)

wherein, in formula (1), $W_A$ is iron loss under 50 Hz elliptic magnetization of 1.7 T in an RD direction (a rolling direction) and 0.6 T in a TD direction (a direction orthogonal to the rolling direction), and $W_B$ is iron loss under 50 Hz alternating magnetization of 1.7 T in the RD direction.

[2] The grain-oriented electrical steel sheet according to [1], wherein a plurality of linear grooves extending in a direction intersecting the rolling direction are formed on a surface of the steel sheet, and wherein the width w of the grooves in the rolling direction, the depth d of the grooves, the diameter R of secondary recrystallized grains in the steel sheet, and an average β angle of the secondary recrystallized grains in the steel sheet satisfy the relation represented by the following formula (2):

[Math. 1]

$$\text{Sin }\beta+4t/R+(w/a\sqrt{2})\times(10d/t)\times10^{-3}\geq0.080, \quad (2)$$

wherein, in formula (2),

β: the average β angle (°) of the secondary recrystallized grains, t: the thickness (mm) of the steel sheet, R: the diameter (mm) of the secondary recrystallized grains, a: the spacing (mm) between the plurality of linear grooves extending in the direction intersecting the rolling direction, w: the width (μm) of the grooves in the rolling direction, and d: the depth (mm) of the grooves.

[3] The grain-oriented electrical steel sheet according to [1] or [2], wherein a magnetic flux density B8 at a magnetizing force of 800 A/m is 1.91 T or more, and the diameter R of the secondary recrystallized grains is 40 mm or more.

[4] A wound core of a transformer, the wound core being formed using the grain-oriented electrical steel sheet according to any of [1] to [3].

[5] A method for producing a wound core of a wound core transformer, the method allowing a building factor to be reduced, the building factor being obtained by dividing the value of iron loss of the wound core transformer by the value of iron loss of a grain-oriented electrical steel sheet used as a material of the wound core, wherein, in the grain-oriented electrical steel sheet used to form the wound core by winding the grain-oriented electrical steel sheet, a sheet thickness t of the grain-oriented electrical steel sheet and an iron loss deterioration ratio obtained by subjecting the grain-oriented electrical steel sheet under elliptic magnetization defined by formula (1) below satisfy the following relations:

when the sheet thickness t≤0.20 mm, the iron loss deterioration ratio is 60% or less;

when 0.20 mm<the sheet thickness t<0.27 mm, the iron loss deterioration ratio is 55% or less; and when 0.27 mm≤the sheet thickness t, the iron loss deterioration ratio is 50% or less, and wherein (the iron loss deterioration ratio under the elliptic magnetization)=$((W_A-W_B)/W_B)\times100$, (1)

wherein, in formula (1), $W_A$ is iron loss under 50 Hz elliptic magnetization of 1.7 T in an RD direction (a rolling direction) and 0.6 T in a TD direction (a direction orthogonal to the rolling direction), and $W_B$ is iron loss under 50 Hz alternating magnetization of 1.7 T in the RD direction.

[6] The method for producing a wound core according to [5], wherein a plurality of linear grooves extending in a direction intersecting the rolling direction are formed on a surface of the steel sheet, and wherein the width w of the grooves in the rolling direction, the depth d of the grooves, the diameter R of secondary recrystallized grains in the steel sheet, and an average β angle of the secondary recrystallized grains in the steel sheet satisfy the relation represented by the following formula (2):

[Math. 2]

$$\text{Sin }\beta+4t/R+(w/a\sqrt{2})\times(10d/t)\times10^{-3}\geq0.080, \quad (2)$$

wherein, in formula (2),

β: the average β angle (°) of the secondary recrystallized grains, t: the thickness (mm) of the steel sheet, R: the diameter (mm) of the secondary recrystallized grains, a: the spacing (mm) between the plurality of linear grooves extending in the direction intersecting the rolling direction, w: the width (μm) of the grooves in the rolling direction, and d: the depth (mm) of the grooves.

[7] The method for producing a wound core according to [5] or [6], wherein, in the grain-oriented electrical steel sheet used, a magnetic flux density B8 at a magnetizing force of 800 A/m is 1.91 T or more, and the diameter R of the secondary recrystallized grains is 40 mm or more.

Advantageous Effects

According to one aspect of the disclosure, a grain-oriented electrical steel sheet that, when used for a wound core of a transformer, is excellent in the effect of reducing transformer iron loss is provided.

Another aspect of the disclosure, by controlling the properties of the grain-oriented electrical steel sheet used for a transformer core, interlaminar transfer between an inner wound core and an outer wound core and the magnetic resistance of lap joint portions are reduced, and the transformer iron loss of a wound core transformer can be reduced irrespective of the design of the transformer core.

Still another aspect of the disclosure, when a wound core of a wound core transformer is formed using, as a material, the grain-oriented electrical steel sheet of the disclosure, the wound core transformer obtained has a small building factor.

BRIEF DESCRIPTION OF DRAWINGS

FIG. 5 is a schematic illustration showing interlaminar transfer portions between the outer wound core and the inner wound cores and lap joint portions.

FIG. 6 is a schematic illustration showing the flows of magnetic flux in the lap joint portions.

DETAILED DESCRIPTION

Figure 1:
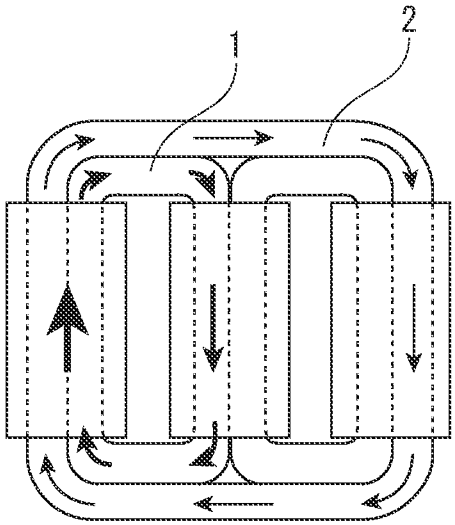
FIG. 1 is a schematic illustration showing an increase in iron loss of inner wound cores when the inner wound cores and an outer wound core are excited simultaneously.
Figure 2:
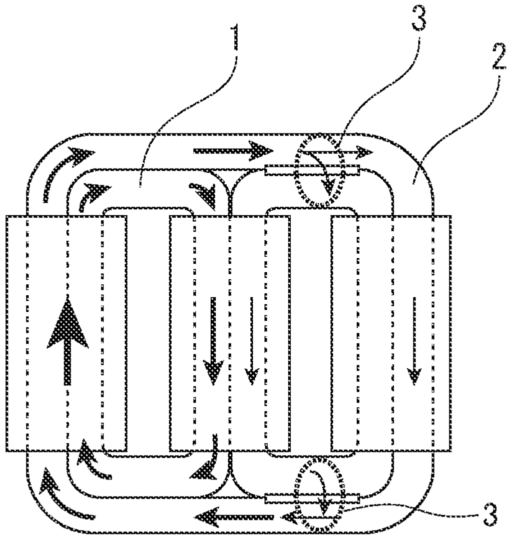
FIG. 2 is a schematic illustration showing interlaminar magnetic flux transfer generated between the outer wound core and the inner wound cores.
Figure 3:
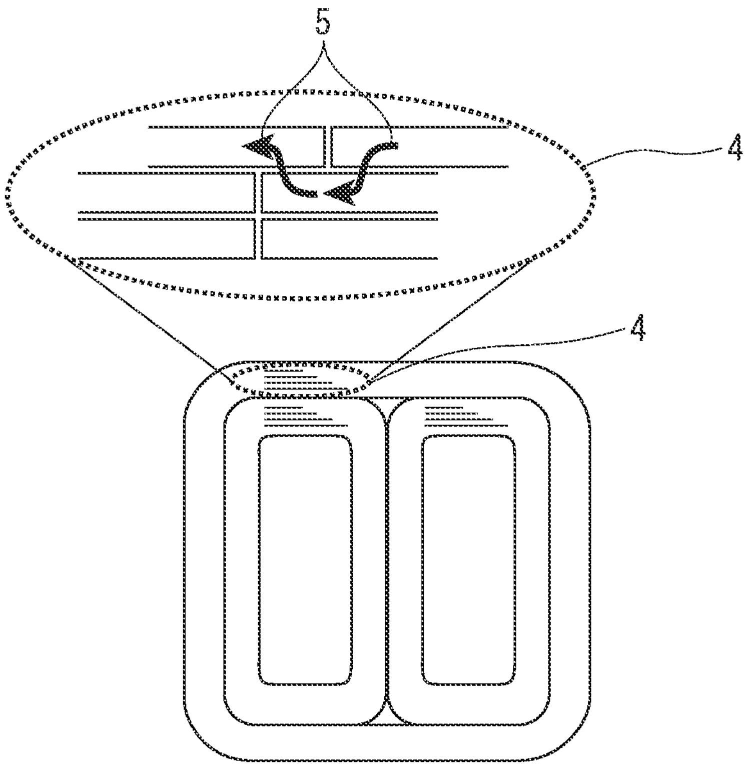
FIG. 3 is a schematic illustration showing a lap joint portion of a wound core.
Figure 4:
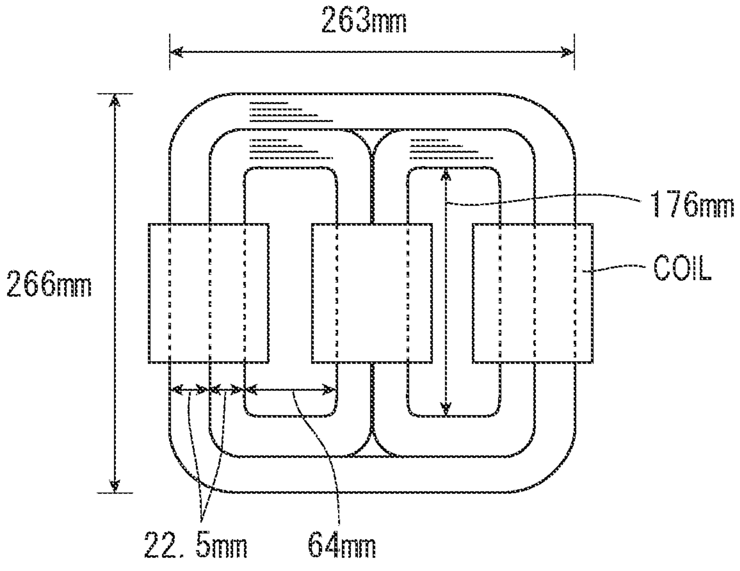
FIG. 4 is a schematic illustration showing the structure of the wound core used for examination.
Figure 7:
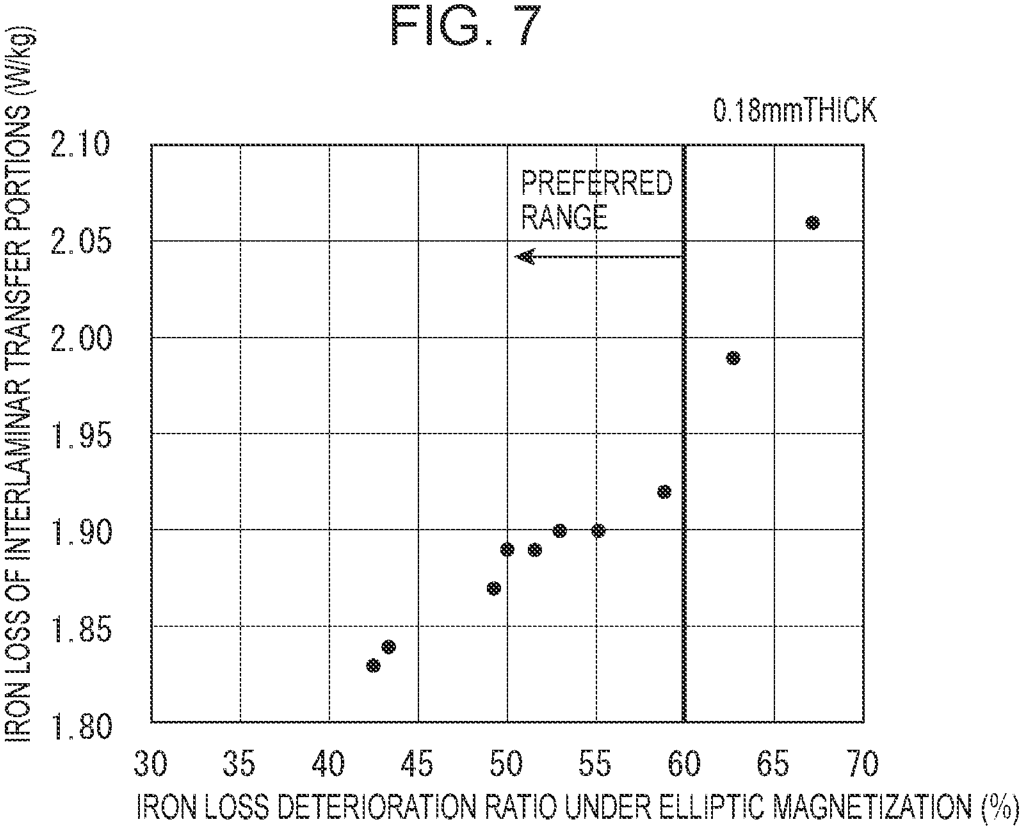
FIG. 7 is a graph showing the relation between an iron loss deterioration ratio and iron loss of the interlaminar transfer portions when a 0.18 mm-thick material is subjected to elliptic magnetization.
Figure 8:
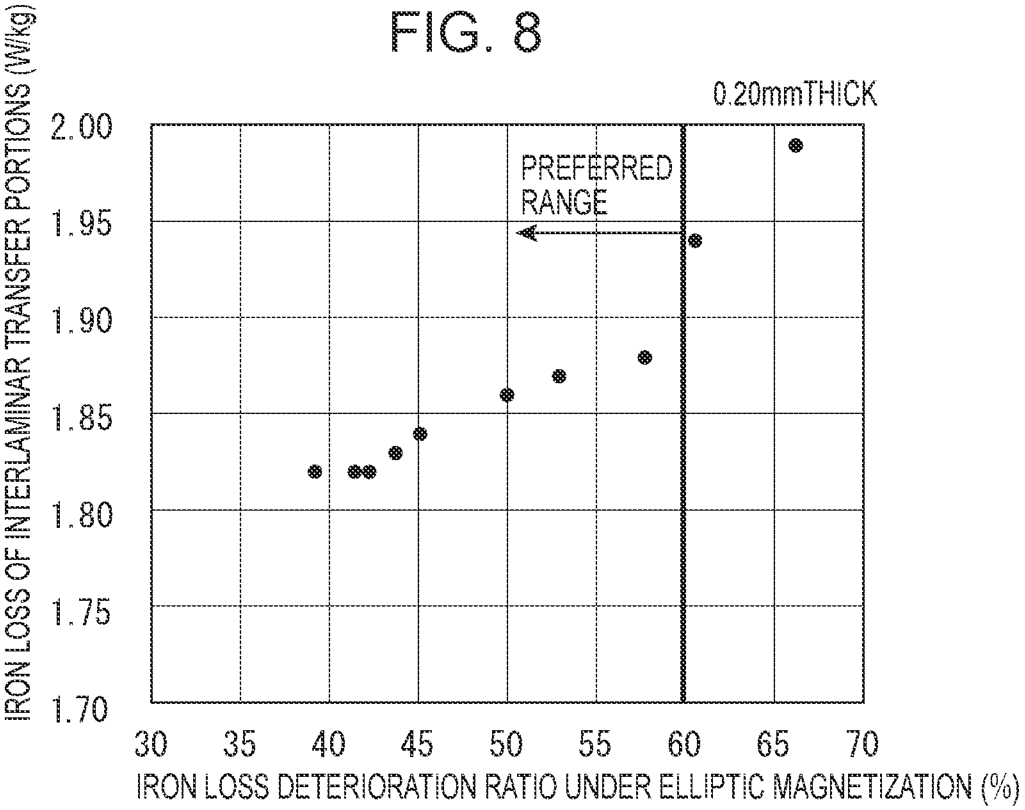
FIG. 8 is a graph showing the relation between the iron loss deterioration ratio and iron loss of the interlaminar transfer portions when a 0.20 mm-thick material is subjected to elliptic magnetization.
Figure 9:
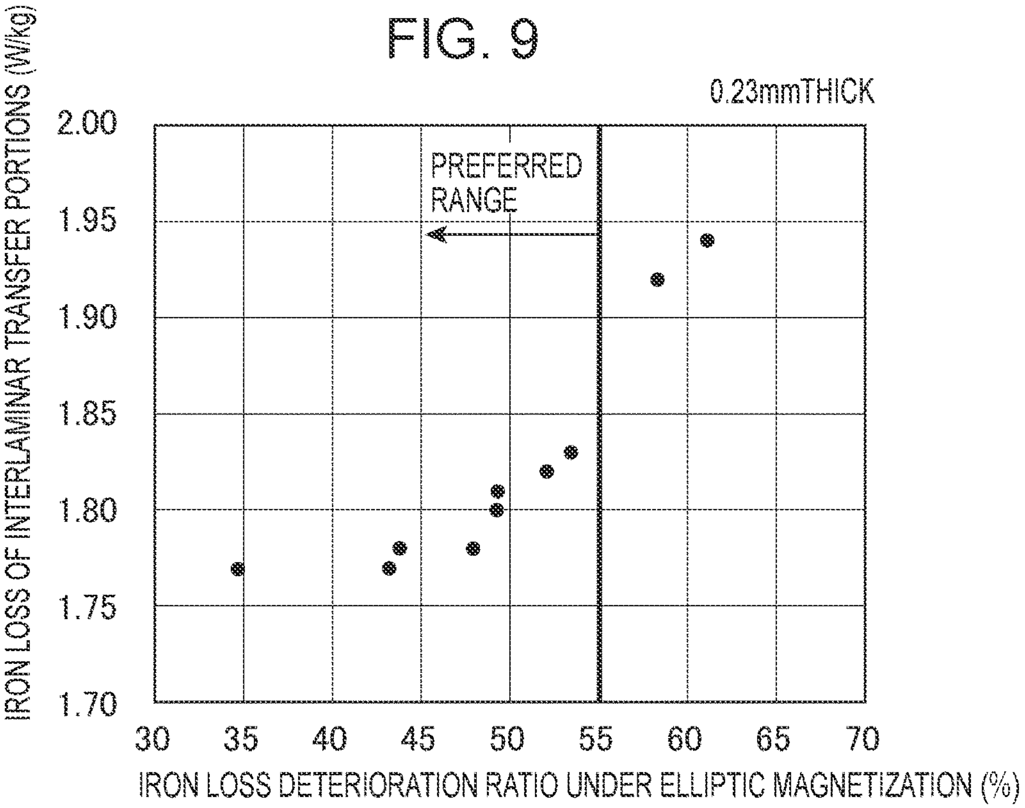
FIG. 9 is a graph showing the relation between the iron loss deterioration ratio and iron loss of the interlaminar transfer portions when a 0.23 mm-thick material is subjected to elliptic magnetization.
Figure 10:
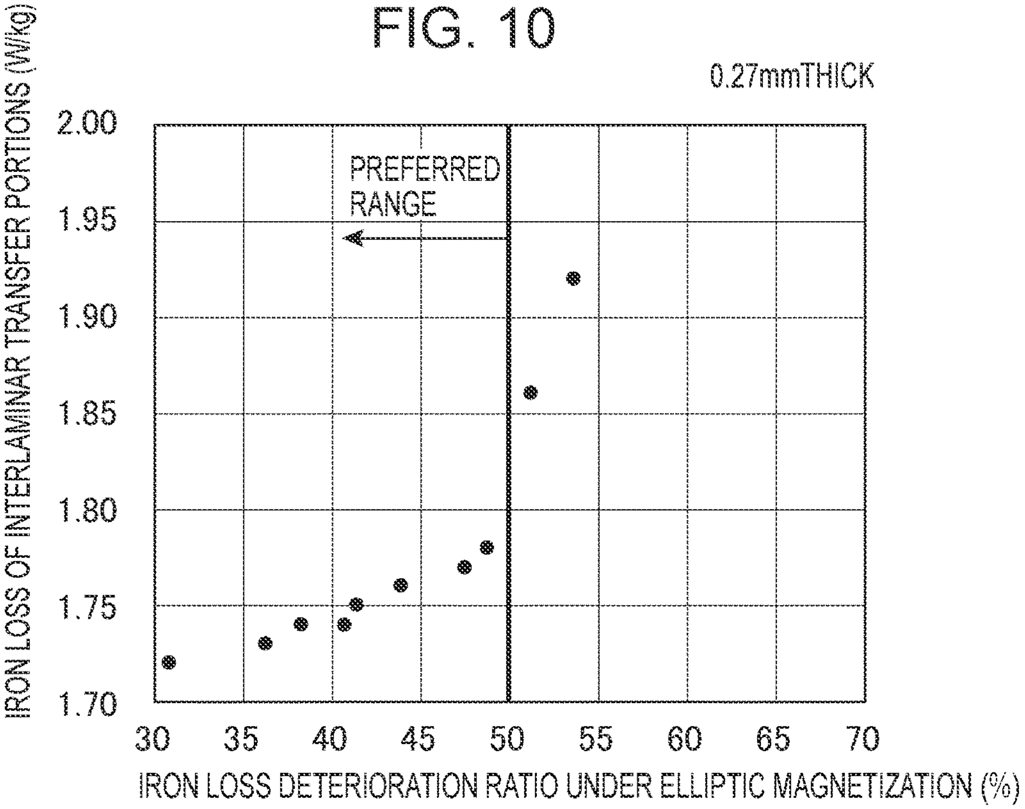
FIG. 10 is a graph showing the relation between the iron loss deterioration ratio and iron loss of the interlaminar transfer portions when a 0.27 mm-thick material is subjected to elliptic magnetization.
Figure 11:
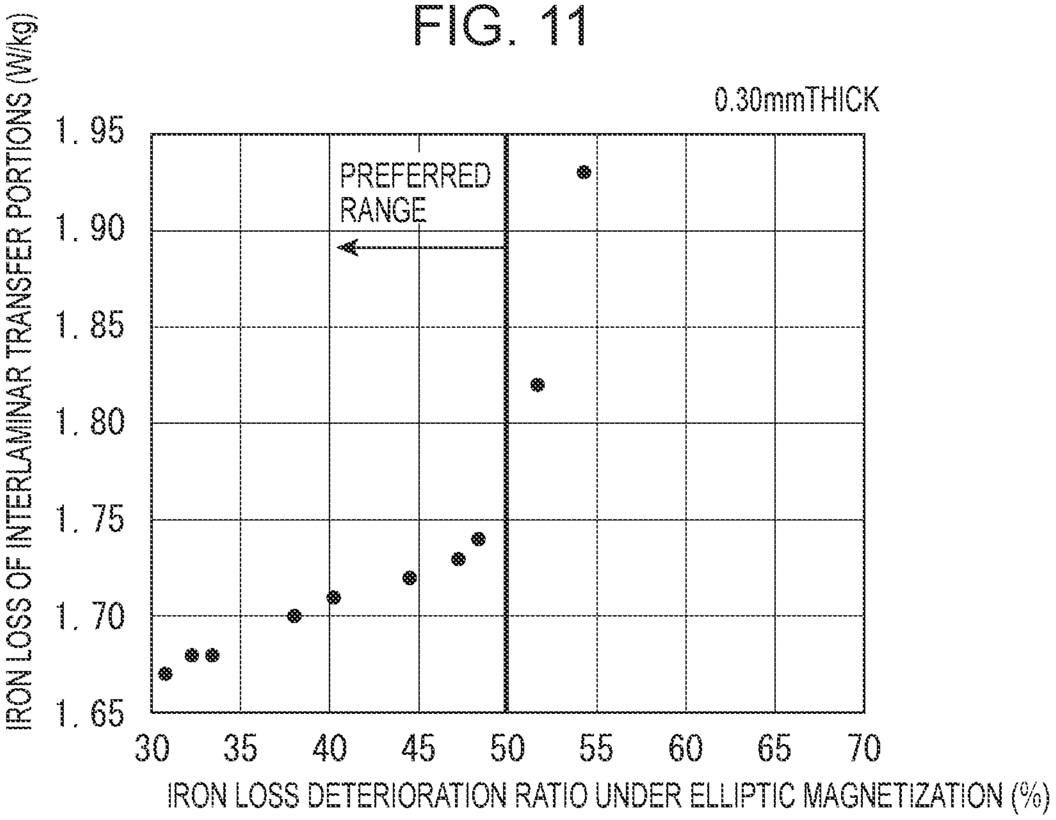
FIG. 11 is a graph showing the relation between the iron loss deterioration ratio and iron loss of the interlaminar transfer portions when a 0.30 mm-thick material is subjected to elliptic magnetization.
Figure 12:
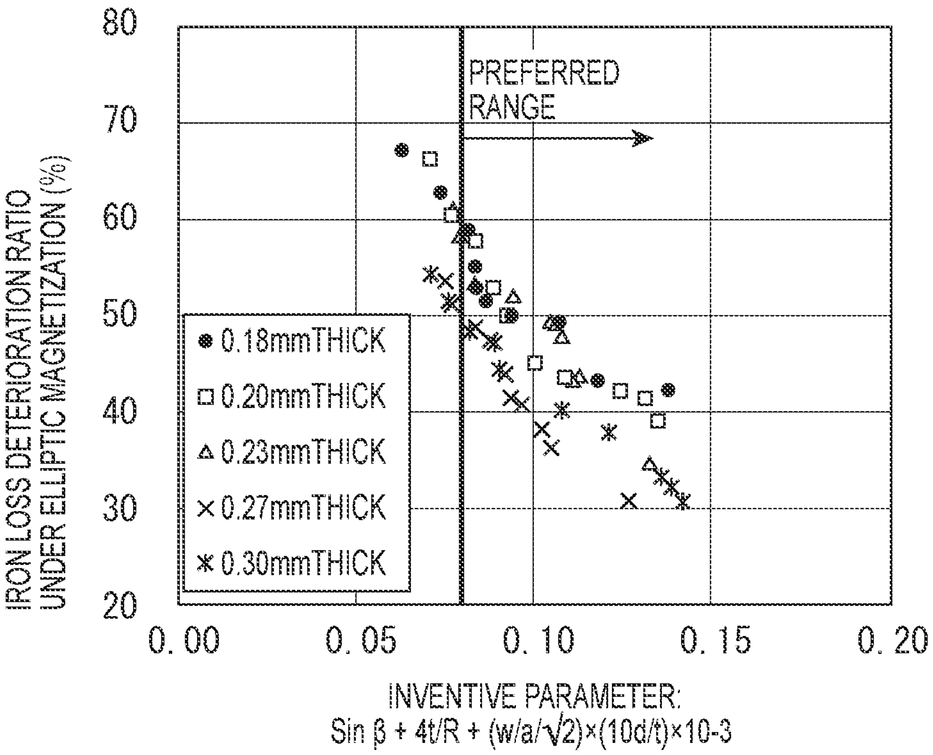
FIG. 12 is a graph showing the relation between a parameter [Sin $\beta+4t/R+(w/a/\sqrt{2})\times(10d/t)\times10^{-3}$] disclosed herein and the iron loss deterioration ratio.

The disclosed embodiments are described in detail. As described above, a grain-oriented electrical steel sheet that gives excellent transformer iron loss satisfying the following conditions is used for a wound transformer core.

The sheet thickness t of the grain-oriented electrical steel sheet (material) and an iron loss deterioration ratio obtained by subjecting steel sheets under elliptic magnetization defined by formula (1) below satisfy the following relations:

- when the sheet thickness t≤0.20 mm, the iron loss deterioration ratio is 60% or less;
- when 0.20 mm<the sheet thickness t<0.27 mm, the iron loss deterioration ratio is 55% or less; and
- when 0.27 mm≤sheet thickness t, the iron loss deterioration ratio is 50% or less.

$$\text{(The iron loss deterioration ratio under the elliptic magnetization)}=((W_A-W_B)/W_B)\times100 \quad (1)$$

In formula (1), $W_A$ is iron loss under 50 Hz elliptic magnetization of 1.7 T in an RD direction (a rolling direction) and 0.6 T in a TD direction (a direction orthogonal to the rolling direction), and $W_B$ is iron loss under 50 Hz alternating magnetization of 1.7 T in the RD direction.

The iron loss in formula (1) above is measured as follows.

($W_A$: Iron loss under 50 Hz elliptic magnetization of 1.7 T in RD direction and 0.6 T in TD direction)

$W_A$ is measured using a two-dimensional single-sheet magnetic measurement device (2D-SST) described in, for example, Non-Patent Literature 2. A grain-oriented electrical steel sheet (material) is subjected to 50 Hz sine wave excitation at a maximum magnetic flux density of 1.7 T in the RD direction and a maximum magnetic flux density of 0.6 T in the TD direction, and the difference in phase between the RD direction and the TD direction during the sine wave excitation is set to 90° to perform excitation under elliptic magnetization. The elliptic magnetization may rotate in a clockwise direction or in counterclockwise direction. It has been pointed out that the measurement value of the iron loss using a clockwise rotation direction differs from the measurement value using a counterclockwise rotation direction. Therefore, both of them are measured and averaged. Various iron loss measurement methods such as a probe method and an H coil method have been proposed, and any of these methods may be used. During excitation, the excitation voltage is feedback-controlled such that the maximum magnetic flux density in the RD direction is 1.7 T and the maximum magnetic flux density in the TD direction is 0.6 T. However, waveform control is not performed except for the moment when the magnetic flux density is maximum even though the waveform of the magnetic flux is slightly distorted from the sine wave. Preferably, the measurement sample has a size of (50 mm×50 mm) or larger in consideration of the number of crystal grains contained in one sample, but this depends on the possible size for excitation of the two-dimensional single-sheet magnetic measurement device. In consideration of variations in the measurement values, it is preferable that, 30 or more samples are used for the measurement for one material and the average of the measurement values is used.

($W_B$: Iron loss under 50 Hz alternating magnetization of 1.7 T in RD direction)

$W_B$ is measured using the same samples as those used for the above measurement under the elliptic magnetization and the same measurement device. 50 Hz sine wave excitation is performed at a maximum magnetic flux density of 1.7 T only in the RD direction. During excitation, the excitation voltage is feedback-controlled such that the maximum magnetic flux density in the RD direction is 1.7 T, and no control is performed in the TD direction.

To keep the iron loss deterioration ratio under the elliptic magnetization within the above range, it is preferable that a plurality of linear grooves extending in a direction intersecting the rolling direction are formed on the surface of the grain-oriented electrical steel sheet (material) such that the width w of the grooves in the rolling direction, the depth d of the grooves, the diameter R of secondary recrystallized grains in the steel sheet, and the average β angle of the secondary recrystallized grains in the steel sheet satisfy the relation represented by formula (2) below.

[Math 3]

$$\text{Sin }\beta+4t/R+(w/a/\sqrt{2})\times(10d/t)\times10^{-3}\geq0.080 \quad (2)$$

In formula (2),

β: the average β angle (°) of the secondary recrystallized grains, t: the thickness (mm) of the steel sheet, R: the diameter (mm) of the secondary recrystallized grains, a: the spacing (mm) between the plurality of linear grooves extending in the direction intersecting the rolling direction, w: the width (μm) of the grooves in the rolling direction, and d: the depth (mm) of the grooves.

The material properties in formula (2) above are measured as follows.

β: Average β Angle (°) of Secondary Recrystallized Grains

The β angle is defined as the angle between the <100> axis of secondary recrystallized grains oriented in the rolling direction of the steel sheet and the rolling surface. The secondary recrystallization orientation of the steel sheet is measured by X-ray crystal diffraction. Since the orientations of the secondary recrystallized grains in the steel sheet vary, the measurement is performed at points set at a 10 mm RD pitch and a 10 mm TD pitch, and the data measured over a measurement area of (500 mm×500 mm) or larger is averaged to determine the average β angle.

R: Diameter (mm) of Secondary Recrystallized Grains

A coating on the surface of the steel sheet is removed by any chemical or electrical method, and the diameters of the secondary recrystallized grains are measured. The number of crystal grains with a size of about 1 $mm^2$ or larger present in a measurement area with a size of (500 mm×500 mm) or larger is measured by visual inspection or digital image processing, and the average area for a single secondary recrystallized grain is determined. The average area is used to compute a circle-equivalent diameter to determine the diameter of the secondary recrystallized grains.

a: Spacing (mm) Between a Plurality of Linear Grooves Extending in Direction Intersecting Rolling Direction The spacing is defined as the spacing between linear grooves in the RD direction. When the spacings between the lines (the spacing between the grooves) are not constant, the examination is performed at five points within a longitudinal length of 500 mm, and their average is used. When the line spacing varies in the width direction of the steel sheet, their average is used.

w: Width (μm) of Grooves in Rolling Direction

The surface of the steel sheet is observed under a microscope to measure the width. Since the width of a groove in the rolling direction is not always constant, observation is performed at five points or more along one linear row within a length of 100 mm in a sample, and their average is used as the groove width of the linear row in the rolling direction. Further, five or more linear rows within a longitudinal length of 500 mm in the sample are observed, and their average is used as the width w.

d: Depth (mm) of Grooves

The cross section of the steel sheet at the grooves is observed under a microscope to measure the depth. Since the depth of a groove is not always constant, observation is performed at five points or more along one linear row within a length of 100 mm in a sample, and their average is used as the groove depth in the linear row. Further, five or more linear rows within a longitudinal length of 500 mm in the sample are observed, and their average is used as the depth d.

A method for producing a grain-oriented electrical steel sheet satisfying the above relations is described. Any method other than the following method may be used provided that formula (2) is satisfied by controlling each parameters, and no particular limitation is imposed on the production method.

Figure 13:
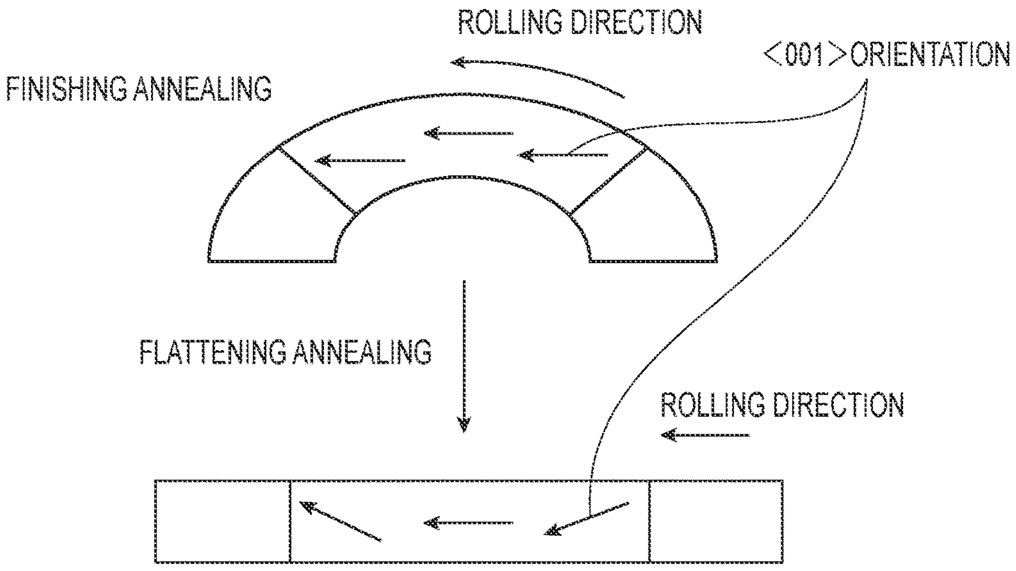
FIG. 13 is a schematic illustration showing an example of a method for controlling an average β angle of secondary recrystallized grains.

The average β angle of the secondary recrystallized grains can be controlled by controlling the primary recrystallization texture or using, for example, a coil set for finishing annealing. For example, when finishing annealing is performed under conditions having the coil set as shown in FIG. 13, the <001> orientations within the crystal grains in such state are uniformly aligned. Then flattening annealing is performed, and the coil is flattened. In this state, the <001> orientation within each crystal grain is inclined to the sheet thickness direction depending on the coil set used for the finishing annealing, and the β angle increases. Specifically, the smaller the coil set, the larger the β angle after the flattening annealing. With excessively larger β angle, the magnetic flux density B8 of the material decreases, and hysteresis loss deteriorates. Therefore, the β angle is preferably 5° or less.

The diameter (mm) of the secondary recrystallized grains can be controlled by controlling the amount of Goss grains present in the primary recrystallized grains. For example, by increasing the final reduction ratio in cold rolling or increasing friction during rolling to thereby increase the amount of shear strain introduced before primary recrystallization of grains, the amount of the Goss grains in the primary recrystallized grains can be increased. Further, the amount of the Goss grains present in the primary recrystallized grains can be controlled also by controlling the heating-up rate during primary recrystallization annealing. The Goss grains in the primary recrystallized grains serve as secondary recrystallization nuclei during finishing annealing. Therefore, the larger the amount of the Goss grains, the larger the amount of secondary recrystallized grains, and which results in smaller diameter of the secondary recrystallized grains.

Examples of a method for forming a plurality of grooves extending in a direction intersecting the rolling direction and used to obtain the magnetic domain refining effect include existing techniques such as (i) an etching method including applying a resist ink to portions of a cold-rolled sheet other than portions in which grooves are to be formed, subjecting the resulting sheet to electropolishing to form grooves, and then removing the resist ink, (ii) a magnetic domain refining technique including applying a load of 882 to 2156 MPa (90 to 220 $kgf/mm^2$) to a finishing-annealed steel sheet to form grooves with a depth of 5 μm or more in a base steel and subjecting the resulting steel sheet to heat treatment at a temperature of 750° C. or higher, and (iii) a method in which grooves are formed by irradiation with a high-energy density laser beam before or after primary recrystallization or secondary recrystallization. In the disclosed embodiments, any of these groove formation methods may be applied. A production issue with the method including applying a load is control of the wear of a gear type roll. A production issue with the groove formation method using irradiation with a high-energy density laser beam is removal of molten iron. It is therefore preferable to form grooves by subjecting a cold-rolled sheet to electrolytic etching.

A specific production method is described using the groove formation by electrolytic etching of a cold-rolled sheet as an example. The width of the grooves in the rolling direction can be controlled by controlling the width of portions not coated with the resist ink. By controlling the spreading of the resist ink or controlling a pattern on a resist ink applying roll, linear grooves having a constant width in the width direction of the steel sheet can be formed. The depth of the grooves can be controlled by the conditions for subsequent electrolytic etching. Specifically, the depth of the grooves is controlled by adjusting the electrolytic etching time or current density.

No particular limitation is imposed on the width of the grooves in the rolling direction provided that formula (2) above is satisfied. However, excessively narrower width induces magnetic poles coupling, leading to an insufficient magnetic domain refining effect. Excessively wider width, to the contrary, reduces the magnetic flux density B8 of the steel sheet. Therefore, the width is preferably from 40 μm to 250 μm inclusive. No particular limitation is imposed on the depth of the grooves provided that formula (2) above is satisfied. However, excessively small depth leads to an insufficient magnetic domain refining effect. Excessively larger depth reduces the magnetic flux density B8 of the steel sheet. Therefore, the depth is preferably from 10 μm or more and about ⅕ or less of the sheet thickness inclusive.

As for the spacing of the plurality of grooves extending in the direction intersecting the rolling direction, the spacing between the grooves formed can be controlled during their production process using any of the above methods. Excessively larger spacing between the grooves reduces the magnetic domain refining effect obtained by the grooves. Therefore, the spacing between the grooves is preferably 10 mm or less.

No particular limitation is imposed on the sheet thickness of the grain-oriented electrical steel sheet of the disclosure. From the viewpoint of manufacturability, onset stability of secondary recrystallization, etc. the sheet thickness is preferably 0.15 mm or more and furthermore 0.18 mm or more. From the viewpoint of reducing eddy-current loss etc., the sheet thickness is preferably 0.35 mm or less and further more preferably 0.30 mm or less.

In the method for producing the grain-oriented electrical steel sheet of the disclosure used for a wound core of a transformer, no limitation is imposed on the matters not directly related to the above properties. However, a recommended preferred component composition and some points of the production method of the disclosure other than the points described above are described.

An inhibitor may be used in the disclosed embodiments. Using, for example, an AlN-based inhibitor, appropriate amounts of Al and N may be added. Using a MnS·MnSe-based inhibitor is used, appropriate amounts of Mn and Se and/or S may be added. Obviously, the both inhibitors may be used in combination. Contents of Al, N, S, and Se, in such case, may be Al: 0.01 to 0.065% by mass, N: 0.005 to 0.012% by mass, S: 0.005 to 0.03% by mass, and Se: 0.005 to 0.03% by mass.

The disclosure may be applied also to a grain-oriented electrical steel sheet in which the contents of Al, N, S, and Se are limited, i.e., no inhibitor is used. The amounts of Al, N, S, and Se in such case may be limited to Al: 100 mass ppm or less, N: 50 mass ppm or less, S: 50 mass ppm or less, and Se: 50 mass ppm or less.

Other basic components and optional components are as follows.

C: 0.08% by Mass or Less

The content of C exceeding 0.08% by mass is difficult to reduce to 50 mass ppm or less at which magnetic aging does not occur during the production process. Therefore, the C content may be 0.08% by mass or less. The lower limit is not provided because secondary recrystallization may occur even in a material containing no C.

Si: 2.0 to 8.0% by Mass

Si is an element effective in increasing the electric resistance of steel and reducing iron loss. However, when the content of Si is less than 2.0% by mass, the effect of reducing the iron loss is insufficient. The content of Si exceeding 8.0% by mass significantly deteriorates workability, and reduces the magnetic flux density. Therefore, the Si content is preferably within the range of 2.0 to 8.0% by mass.

Mn: 0.005 to 1.0% by Mass

Mn is an element necessary for improving hot workability. However, the Mn content being less than 0.005% by mass, the effect of Mn added is small. The Mn content exceeding 1.0% by mass reduces the magnetic flux density of a product sheet. Therefore, the Mn content is preferably within the range of 0.005 to 1.0% by mass.

In addition to the above basic components, the following elements may be appropriately added as components improving the magnetic properties.

At least one selected from Ni: 0.03 to 1.50% by mass, Sn: 0.01 to 1.50% by mass, Sb: 0.005 to 1.50% by mass, Cu: 0.03 to 3.0% by mass, P: 0.03 to 0.50% by mass, Mo: 0.005 to 0.10% by mass, and Cr: 0.03 to 1.50% by mass.

Ni is an element useful to improve the texture of a hot-rolled sheet to thereby improve its magnetic properties. However, the content being less than 0.03% by mass, the effect of improving the magnetic properties is small. The content exceeding 1.50% by mass, secondary recrystallization becomes unstable, deteriorating the magnetic properties. Therefore, the amount of Ni is within the range of preferably 0.03 to 1.50% by mass.

Sn, Sb, Cu, P, Cr, and Mo are elements useful to improve the magnetic properties. However, if their contents are lower than their lower limits of the components described above, the effect of improving the magnetic properties is small. The contents exceeding the upper limits of the components described above inhibit the growth of the secondary recrystallized grains. It is therefore preferable that the contents of these components are within the respective ranges described above. The remainder other than the above components is Fe and inevitable impurities mixed during the production process.

The steel having a component composition adjusted to the above appropriate component composition may be subjected to a standard ingot making process or a standard continuous casting process to form a slab, or a thin cast piece having a thickness of 100 mm or less may be produced by direct continuous casting process. The slab is heated using a common method and then hot-rolled. However, the slab may be subjected directly to hot-rolling without heating after casting. The thin cast piece may be hot-rolled or may be subjected to the subsequent process without the hot-rolling. Then the hot-rolled sheet is optionally annealed and then subjected to cold rolling once or subjected to cold rolling twice or more including process annealing to obtain a final sheet thickness. Then the product is subjected to decarburization annealing and finishing annealing. Then an insulating tension coating is applied, and flattening annealing is performed. In the course of the above process, grooves are formed by electrolytic etching after the cold rolling or formed at some point after the cold rolling by applying a load using a gear type roll or by irradiation with a laser beam. In the composition of the steel product, the C content is reduced to 50 ppm or less by the decarburization annealing, and the contents of Al, N, S, and Se are reduced to the level of inevitable impurities by purification in the finishing annealing.

The characteristics of the three-phase three-legged excitation-type wound core transformer have been described in the present specification. However, the disclosed embodiments are also suitable for wound core transformers having other joint portion structures such as three-phase five-legged cores and single-phase excitation-type cores.

EXAMPLES

Figure 14:
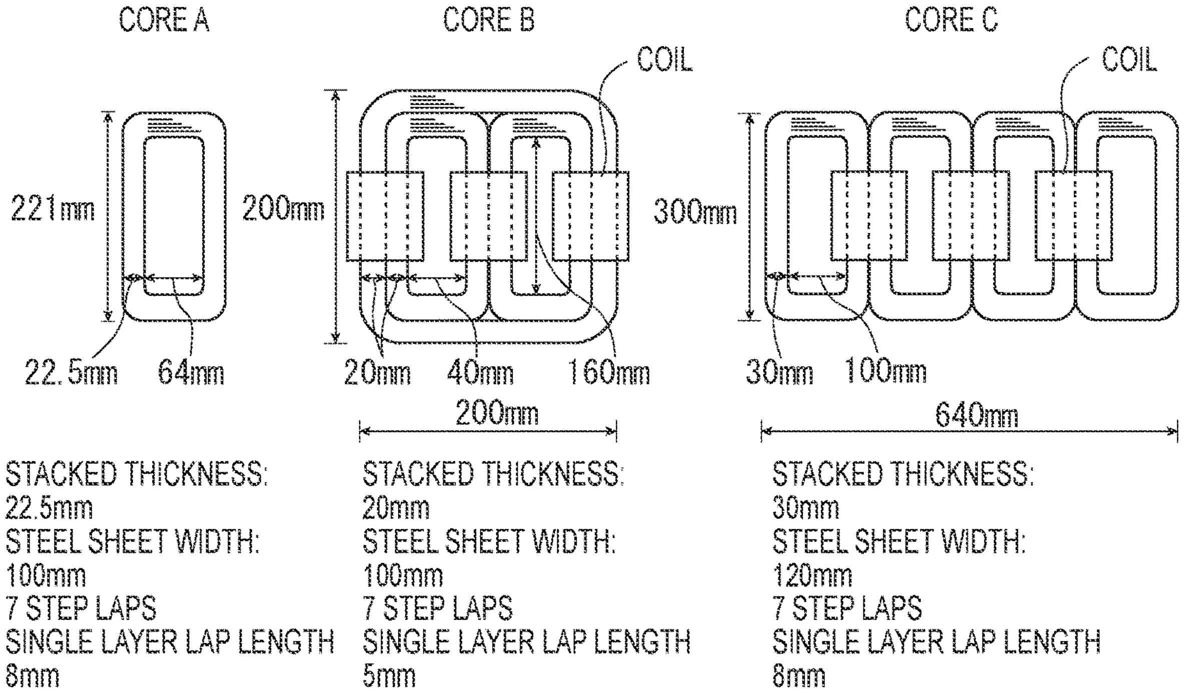
FIG. 14 shows schematic illustrations showing the structures of wound cores A to C produced in Examples.

Cold-finished grain-oriented electrical steel sheets having a thickness of 0.18 to 0.30 mm were produced at different reduction ratios and different heating-up rates for primary recrystallization annealing. During the process, electrolytic etching was performed after cold rolling under various conditions to form grooves, and grain-oriented electrical steel sheets having material properties shown in Table 3 were obtained. These electrical steel sheets were subjected to two-dimensional magnetic measurement by the method described in the present description to thereby measure their iron loss deterioration ratio under elliptic magnetization. Transformer wound cores A to C having core shapes shown in FIG. 14 were produced using each of the above materials. As for the core A, a single-phase winding was formed, and iron loss under single-phase excitation at 50 Hz and 1.7 T was measured. As for the cores B and C, a three-phase winding was formed, and iron loss under three-phase excitation at 50 Hz and 1.7 T was measured. The wound core A shown in FIG. 14 has a shape with a stacked thickness of 22.5 mm, a steel sheet width of 100 mm, seven step laps, and a single step lap length of 8 mm. The wound core B has a shape with a stacked thickness of 20 mm, a steel sheet width of 100 mm, seven step laps, and a single step lap length of 5 mm. The wound core C has a shape with a stacked thickness of 30 mm, a steel sheet width of 120 mm, seven step laps, and a single step lap length of 8 mm. In grain-oriented electrical steel sheets in which the iron loss deterioration ratio under elliptic magnetization satisfies the range of the disclosure, the BF for each of the core shapes was smaller than those in Comparative Examples. In particular, when a grain-oriented electrical steel sheet in which the magnetic flux density B8 at a magnetizing force of 800 A/m was equal to or larger than 1.91 T and the diameter R of the secondary recrystallized grains was equal to or larger than 40 mm was used, the material iron loss was small, the BF was small, and the iron loss of the transformer was very small.

TABLE 3

| | Material properties | | | Linear grooves | | | | |
|---|---|---|---|---|---|---|---|---|
| Condition | β: Average β angle of secondary recrystallized grains (°) | t: Steel sheet thickness (mm) | R: Secondary recrystallized grain diameter (mm) | a: Spacing between a plurality of linear grooves extending in direction intersecting rolling direction (mm) | w: Width of grooves in rolling direction (μm) | d: Depth of grooves (mm) | Disclosed parameter*1 | Iron loss deterioration ratio*2 (%) |
| 1 | 2.3 | 0.18 | 24 | 3 | 200 | 0.023 | 0.130 | 42 |
| 2 | 2.2 | 0.18 | 22 | 4 | 200 | 0.022 | 0.114 | 43 |
| 3 | 2.1 | 0.18 | 23 | 4 | 180 | 0.018 | 0.100 | 48 |
| 4 | 2.3 | 0.18 | 21 | 5 | 150 | 0.018 | 0.096 | 50 |
| 5 | 2.2 | 0.18 | 20 | 5 | 150 | 0.015 | 0.092 | 52 |
| 6 | 2.1 | 0.18 | 21 | 5 | 120 | 0.015 | 0.085 | 56 |
| 7 | 2.6 | 0.18 | 24 | 5 | 100 | 0.014 | 0.086 | 58 |
| 8 | 2.3 | 0.18 | 22 | 5 | 80 | 0.015 | 0.082 | 59 |
| 9 | 2.1 | 0.18 | 26 | 5 | 80 | 0.015 | 0.074 | 63 |
| 10 | 1.8 | 0.18 | 28 | 5 | 50 | 0.015 | 0.063 | 67 |
| 11 | 1.7 | 0.18 | 44 | 3 | 120 | 0.022 | 0.081 | 58 |
| 12 | 1.6 | 0.18 | 51 | 3 | 180 | 0.022 | 0.094 | 49 |
| 13 | 1.3 | 0.18 | 38 | 3 | 150 | 0.022 | 0.085 | 55 |
| 14 | 1.7 | 0.18 | 57 | 5 | 150 | 0.015 | 0.060 | 68 |
| 15 | 2.4 | 0.20 | 17 | 3 | 160 | 0.025 | 0.136 | 40 |
| 16 | 2.3 | 0.20 | 18 | 3 | 160 | 0.025 | 0.132 | 42 |
| 17 | 2.2 | 0.20 | 17 | 3 | 140 | 0.022 | 0.122 | 43 |
| 18 | 2.3 | 0.20 | 20 | 4 | 140 | 0.022 | 0.107 | 44 |
| 19 | 2.1 | 0.20 | 19 | 4 | 120 | 0.020 | 0.100 | 45 |
| 20 | 2.2 | 0.20 | 21 | 4 | 120 | 0.015 | 0.092 | 51 |
| 21 | 2.3 | 0.20 | 22 | 5 | 100 | 0.017 | 0.089 | 54 |
| 22 | 2.0 | 0.20 | 20 | 5 | 90 | 0.015 | 0.084 | 59 |
| 23 | 1.8 | 0.20 | 21 | 5 | 70 | 0.015 | 0.077 | 63 |
| 24 | 1.8 | 0.20 | 24 | 5 | 70 | 0.015 | 0.072 | 67 |
| 25 | 1.4 | 0.20 | 42 | 3 | 150 | 0.025 | 0.088 | 49 |
| 26 | 1.8 | 0.20 | 64 | 3 | 180 | 0.022 | 0.091 | 45 |
| 27 | 1.2 | 0.20 | 36 | 3 | 150 | 0.022 | 0.082 | 55 |
| 28 | 1.3 | 0.20 | 54 | 5 | 90 | 0.015 | 0.047 | 75 |
| 29 | 2.5 | 0.23 | 18 | 3 | 180 | 0.025 | 0.141 | 38 |
| 30 | 2.2 | 0.23 | 21 | 3 | 150 | 0.025 | 0.121 | 42 |
| 31 | 2.3 | 0.23 | 19 | 3 | 150 | 0.018 | 0.116 | 43 |
| 32 | 2.2 | 0.23 | 18 | 4 | 120 | 0.021 | 0.109 | 46 |
| 33 | 2.5 | 0.23 | 21 | 4 | 120 | 0.019 | 0.105 | 47 |
| 34 | 2.4 | 0.23 | 22 | 4 | 100 | 0.020 | 0.099 | 48 |
| 35 | 2.0 | 0.23 | 24 | 3 | 80 | 0.025 | 0.094 | 53 |
| 36 | 1.8 | 0.23 | 26 | 3 | 80 | 0.020 | 0.083 | 54 |
| 37 | 1.7 | 0.23 | 28 | 3 | 80 | 0.017 | 0.076 | 57 |
| 38 | 1.7 | 0.23 | 28 | 4 | 80 | 0.018 | 0.074 | 62 |
| 39 | 1.9 | 0.23 | 49 | 3 | 150 | 0.025 | 0.090 | 50 |
| 40 | 1.8 | 0.23 | 75 | 3 | 200 | 0.022 | 0.089 | 49 |
| 41 | 1.7 | 0.23 | 38 | 3 | 170 | 0.022 | 0.092 | 47 |
| 42 | 1.8 | 0.23 | 62 | 4 | 90 | 0.02 | 0.060 | 62 |
| 43 | 2.3 | 0.27 | 17 | 3 | 150 | 0.027 | 0.139 | 32 |
| 44 | 2.1 | 0.27 | 21 | 3 | 120 | 0.026 | 0.115 | 37 |
| 45 | 2.2 | 0.27 | 22 | 3 | 120 | 0.020 | 0.108 | 39 |
| 46 | 2.2 | 0.27 | 23 | 4 | 100 | 0.019 | 0.098 | 42 |
| 47 | 2.3 | 0.27 | 24 | 4 | 80 | 0.018 | 0.095 | 43 |
| 48 | 2.0 | 0.27 | 25 | 4 | 80 | 0.020 | 0.089 | 44 |
| 49 | 1.7 | 0.27 | 27 | 3 | 80 | 0.020 | 0.084 | 48 |
| 50 | 1.7 | 0.27 | 29 | 3 | 80 | 0.020 | 0.081 | 49 |
| 51 | 1.8 | 0.27 | 27 | 5 | 60 | 0.017 | 0.077 | 52 |
| 52 | 1.6 | 0.27 | 26 | 5 | 60 | 0.018 | 0.075 | 54 |
| 53 | 1.7 | 0.27 | 45 | 3 | 120 | 0.029 | 0.084 | 48 |

TABLE 3-continued

| | | | | | | | | |
|---|---|---|---|---|---|---|---|---|
| 54 | 1.3 | 0.27 | 68 | 3 | 150 | 0.032 | 0.080 | 49 |
| 55 | 1.6 | 0.27 | 37 | 3 | 150 | 0.025 | 0.090 | 43 |
| 56 | 1.8 | 0.27 | 58 | 4 | 120 | 0.024 | 0.069 | 54 |
| 57 | 2.1 | 0.30 | 16 | 4 | 200 | 0.032 | 0.149 | 28 |
| 58 | 2.0 | 0.30 | 17 | 3 | 180 | 0.028 | 0.145 | 32 |
| 59 | 1.8 | 0.30 | 15 | 4 | 180 | 0.025 | 0.138 | 34 |
| 60 | 2.2 | 0.30 | 20 | 4 | 150 | 0.027 | 0.122 | 38 |
| 61 | 2.1 | 0.30 | 23 | 4 | 150 | 0.022 | 0.108 | 41 |
| 62 | 1.9 | 0.30 | 31 | 4 | 120 | 0.025 | 0.090 | 45 |
| 63 | 1.8 | 0.30 | 28 | 3 | 100 | 0.021 | 0.091 | 47 |
| 64 | 1.7 | 0.30 | 32 | 3 | 80 | 0.024 | 0.082 | 49 |
| 65 | 1.8 | 0.30 | 35 | 5 | 80 | 0.025 | 0.075 | 52 |
| 66 | 1.8 | 0.30 | 37 | 6 | 80 | 0.025 | 0.072 | 55 |
| 67 | 1.5 | 0.30 | 49 | 3 | 150 | 0.033 | 0.090 | 41 |
| 68 | 1.6 | 0.30 | 62 | 3 | 180 | 0.035 | 0.097 | 44 |
| 69 | 1.7 | 0.30 | 34 | 3 | 150 | 0.032 | 0.103 | 40 |
| 70 | 1.9 | 0.30 | 63 | 5 | 120 | 0.027 | 0.067 | 53 |

| | Material magnetic properties | | Core A | | Core B | | Core C | | |
|---|---|---|---|---|---|---|---|---|---|
| Condition | B8 (T) | Material iron loss W17/50 (W/kg) | Transformer iron loss (W/kg) | BF | Transformer iron loss (W/kg) | BF | Transformer iron loss (W/kg) | BF | Remarks |
| 1 | 1.87 | 0.65 | 0.66 | 1.02 | 0.85 | 1.31 | 0.93 | 1.43 | Inventive Example |
| 2 | 1.86 | 0.67 | 0.68 | 1.01 | 0.88 | 1.31 | 0.96 | 1.43 | Inventive Example |
| 3 | 1.88 | 0.65 | 0.66 | 1.02 | 0.86 | 1.32 | 0.92 | 1.42 | Inventive Example |
| 4 | 1.87 | 0.68 | 0.69 | 1.01 | 0.90 | 1.33 | 0.97 | 1.43 | Inventive Example |
| 5 | 1.87 | 0.68 | 0.69 | 1.01 | 0.90 | 1.33 | 0.97 | 1.42 | Inventive Example |
| 6 | 1.87 | 0.68 | 0.69 | 1.02 | 0.90 | 1.33 | 0.97 | 1.43 | Inventive Example |
| 7 | 1.86 | 0.70 | 0.71 | 1.02 | 0.93 | 1.33 | 0.99 | 1.41 | Inventive Example |
| 8 | 1.88 | 0.68 | 0.69 | 1.01 | 0.90 | 1.33 | 0.97 | 1.42 | Inventive Example |
| 9 | 1.88 | 0.67 | 0.70 | 1.05 | 0.93 | 1.39 | 1.00 | 1.49 | Comparative Example |
| 10 | 1.88 | 0.67 | 0.70 | 1.05 | 0.94 | 1.40 | 1.01 | 1.50 | Comparative Example |
| 11 | 1.91 | 0.60 | 0.61 | 1.01 | 0.79 | 1.32 | 0.85 | 1.41 | Inventive Example (particularly preferable) |
| 12 | 1.92 | 0.59 | 0.58 | 0.99 | 0.77 | 1.31 | 0.84 | 1.42 | Inventive Example (particularly preferable) |
| 13 | 1.89 | 0.64 | 0.64 | 1.00 | 0.83 | 1.30 | 0.91 | 1.42 | Inventive Example |
| 14 | 1.92 | 0.63 | 0.67 | 1.07 | 0.91 | 1.45 | 0.98 | 1.55 | Comparative Example |
| 15 | 1.87 | 0.68 | 0.69 | 1.01 | 0.88 | 1.29 | 0.99 | 1.45 | Inventive Example |
| 16 | 1.87 | 0.67 | 0.68 | 1.01 | 0.86 | 1.29 | 0.97 | 1.45 | Inventive Example |
| 17 | 1.88 | 0.69 | 0.70 | 1.02 | 0.88 | 1.28 | 1.01 | 1.46 | Inventive Example |
| 18 | 1.88 | 0.70 | 0.71 | 1.01 | 0.90 | 1.28 | 1.02 | 1.46 | Inventive Example |
| 19 | 1.89 | 0.71 | 0.72 | 1.01 | 0.91 | 1.28 | 1.03 | 1.45 | Inventive Example |
| 20 | 1.88 | 0.70 | 0.71 | 1.01 | 0.90 | 1.28 | 1.03 | 1.47 | Inventive Example |
| 21 | 1.88 | 0.71 | 0.71 | 1.00 | 0.92 | 1.29 | 1.04 | 1.46 | Inventive Example |
| 22 | 1.88 | 0.71 | 0.72 | 1.01 | 0.92 | 1.30 | 1.04 | 1.46 | Inventive Example |
| 23 | 1.89 | 0.71 | 0.75 | 1.06 | 0.98 | 1.38 | 1.08 | 1.52 | Comparative Example |
| 24 | 1.89 | 0.71 | 0.75 | 1.06 | 0.99 | 1.39 | 1.08 | 1.52 | Comparative Example |

TABLE 3-continued

| | | | | | | | | | |
|---|---|---|---|---|---|---|---|---|---|
| 25 | 1.91 | 0.65 | 0.66 | 1.01 | 0.83 | 1.27 | 0.94 | 1.45 | Inventive Example (particularly preferable) |
| 26 | 1.92 | 0.63 | 0.63 | 1.00 | 0.80 | 1.27 | 0.92 | 1.46 | Inventive Example (particularly preferable) |
| 27 | 1.90 | 0.66 | 0.67 | 1.01 | 0.84 | 1.28 | 0.96 | 1.46 | Inventive Example |
| 28 | 1.92 | 0.66 | 0.71 | 1.08 | 0.92 | 1.39 | 1.05 | 1.59 | Comparative Example |
| 29 | 1.86 | 0.74 | 0.75 | 1.01 | 0.94 | 1.27 | 1.09 | 1.47 | Inventive Example |
| 30 | 1.87 | 0.75 | 0.76 | 1.01 | 0.95 | 1.26 | 1.10 | 1.47 | Inventive Example |
| 31 | 1.87 | 0.75 | 0.75 | 1.00 | 0.95 | 1.26 | 1.10 | 1.47 | Inventive Example |
| 32 | 1.88 | 0.76 | 0.77 | 1.01 | 0.96 | 1.26 | 1.12 | 1.48 | Inventive Example |
| 33 | 1.87 | 0.76 | 0.77 | 1.01 | 0.97 | 1.27 | 1.12 | 1.48 | Inventive Example |
| 34 | 1.87 | 0.77 | 0.78 | 1.01 | 0.98 | 1.27 | 1.14 | 1.48 | Inventive Example |
| 35 | 1.88 | 0.74 | 0.75 | 1.01 | 0.93 | 1.26 | 1.09 | 1.47 | Inventive Example |
| 36 | 1.88 | 0.73 | 0.74 | 1.02 | 0.93 | 1.28 | 1.08 | 1.48 | Inventive Example |
| 37 | 1.89 | 0.74 | 0.78 | 1.05 | 1.00 | 1.35 | 1.14 | 1.54 | Comparative Example |
| 38 | 1.90 | 0.75 | 0.79 | 1.05 | 1.01 | 1.35 | 1.16 | 1.55 | Comparative Example |
| 39 | 1.92 | 0.69 | 0.69 | 1.00 | 0.87 | 1.26 | 1.02 | 1.48 | Inventive Example (particularly preferable) |
| 40 | 1.93 | 0.68 | 0.69 | 1.01 | 0.85 | 1.25 | 1.00 | 1.47 | Inventive Example (particularly preferable) |
| 41 | 1.90 | 0.72 | 0.73 | 1.01 | 0.91 | 1.26 | 1.06 | 1.47 | Inventive Example |
| 42 | 1.92 | 0.68 | 0.73 | 1.08 | 0.97 | 1.42 | 1.10 | 1.62 | Comparative Example |
| 43 | 1.88 | 0.83 | 0.83 | 1.00 | 1.03 | 1.24 | 1.21 | 1.46 | Inventive Example |
| 44 | 1.89 | 0.82 | 0.83 | 1.01 | 1.02 | 1.24 | 1.21 | 1.47 | Inventive Example |
| 45 | 1.89 | 0.81 | 0.81 | 1.00 | 1.01 | 1.25 | 1.18 | 1.46 | Inventive Example |
| 46 | 1.88 | 0.83 | 0.83 | 1.01 | 1.03 | 1.24 | 1.22 | 1.47 | Inventive Example |
| 47 | 1.89 | 0.83 | 0.83 | 1.01 | 1.04 | 1.25 | 1.22 | 1.47 | Inventive Example |
| 48 | 1.89 | 0.84 | 0.85 | 1.01 | 1.04 | 1.24 | 1.23 | 1.47 | Inventive Example |
| 49 | 1.89 | 0.85 | 0.86 | 1.01 | 1.06 | 1.25 | 1.25 | 1.47 | Inventive Example |
| 50 | 1.89 | 0.84 | 0.85 | 1.02 | 1.05 | 1.25 | 1.23 | 1.47 | Inventive Example |
| 51 | 1.89 | 0.85 | 0.90 | 1.06 | 1.12 | 1.32 | 1.33 | 1.56 | Comparative Example |
| 52 | 1.89 | 0.82 | 0.87 | 1.06 | 1.09 | 1.33 | 1.28 | 1.56 | Comparative Example |
| 53 | 1.92 | 0.77 | 0.77 | 1.00 | 0.96 | 1.25 | 1.12 | 1.46 | Inventive Example (particularly preferable) |
| 54 | 1.93 | 0.75 | 0.75 | 1.00 | 0.94 | 1.25 | 1.10 | 1.47 | Inventive Example (particularly preferable) |
| 55 | 1.90 | 0.80 | 0.81 | 1.01 | 0.99 | 1.24 | 1.17 | 1.46 | Inventive Example |
| 56 | 1.93 | 0.77 | 0.85 | 1.10 | 1.06 | 1.38 | 1.25 | 1.62 | Comparative Example |
| 57 | 1.90 | 0.91 | 0.91 | 1.00 | 1.11 | 1.22 | 1.34 | 1.47 | Inventive Example |
| 58 | 1.90 | 0.93 | 0.93 | 1.01 | 1.13 | 1.21 | 1.38 | 1.48 | Inventive Example |

TABLE 3-continued

| | | | | | | | | | |
|---|---|---|---|---|---|---|---|---|---|
| 59 | 1.90 | 0.92 | 0.92 | 1.00 | 1.13 | 1.23 | 1.37 | 1.49 | Inventive Example |
| 60 | 1.89 | 0.92 | 0.92 | 1.00 | 1.12 | 1.22 | 1.37 | 1.49 | Inventive Example |
| 61 | 1.90 | 0.92 | 0.93 | 1.01 | 1.12 | 1.22 | 1.36 | 1.48 | Inventive Example |
| 62 | 1.90 | 0.93 | 0.93 | 1.00 | 1.13 | 1.22 | 1.39 | 1.49 | Inventive Example |
| 63 | 1.90 | 0.94 | 0.95 | 1.01 | 1.16 | 1.23 | 1.40 | 1.49 | Inventive Example |
| 64 | 1.90 | 0.95 | 0.96 | 1.01 | 1.17 | 1.23 | 1.42 | 1.49 | Inventive Example |
| 65 | 1.90 | 0.96 | 1.01 | 1.05 | 1.24 | 1.29 | 1.51 | 1.57 | Comparative Example |
| 66 | 1.90 | 0.97 | 1.03 | 1.06 | 1.25 | 1.29 | 1.53 | 1.58 | Comparative Example |
| 67 | 1.93 | 0.85 | 0.85 | 1.00 | 1.05 | 1.23 | 1.25 | 1.47 | Inventive Example (particularly preferable) |
| 68 | 1.92 | 0.86 | 0.87 | 1.01 | 1.05 | 1.22 | 1.27 | 1.48 | Inventive Example (particularly preferable) |
| 69 | 1.90 | 0.91 | 0.91 | 1.00 | 1.12 | 1.23 | 1.34 | 1.47 | Inventive Example |
| 70 | 1.94 | 0.86 | 0.96 | 1.12 | 1.16 | 1.35 | 1.43 | 1.66 | Comparative Example |

*[1]Sin β + 4t/R + (W/a/√2) × (10d/t) × $10^{-3}$: underlines indicate that disclosed parameter is not satisfied.

*[2]Iron loss deterioration ratio under elliptic magnetization: underlined values are outside the range of the disclosure.

The invention claimed is:

1. A grain-oriented electrical steel sheet used for a wound core of a transformer, the steel sheet having a sheet thickness t, wherein:

the sheet thickness t and an iron loss deterioration ratio obtained when the steel sheet is subjected to elliptic magnetization satisfy the following relations:

when the sheet thickness t≤0.20 mm, the iron loss deterioration ratio is 60% or less;

when 0.20 mm<the sheet thickness t<0.27 mm, the iron loss deterioration ratio is 55% or less; and when 0.27 mm≤the sheet thickness t, the iron loss deterioration ratio is 50% or less, and the iron loss deterioration ratio is defined by formula (1) below:

$$((W_A-W_B)/W_B)\times 100 \quad (1)$$

where, in formula (1):

$W_A$ is iron loss under 50 Hz elliptic magnetization of 1.7 T in a rolling direction and 0.6 T in a direction orthogonal to the rolling direction, and $W_B$ is iron loss under 50 Hz alternating magnetization of 1.7 T in the rolling direction.

2. The grain-oriented electrical steel sheet according to claim 1, wherein:

the steel sheet includes:

secondary recrystallized grains in the steel sheet, and a plurality of linear grooves on a surface of the steel sheet, the plurality of linear grooves extending in a direction intersecting the rolling direction, and a width w of the grooves in the rolling direction, a depth d of the grooves, a diameter R of the secondary recrystallized grains, and an average β angle of the secondary recrystallized grains satisfy the relation represented by the following formula (2):

[Math. 1]

$$\text{Sin}\ \beta+4t/R+(w/a/\sqrt{2})\times(10d/t)\times 10^{-3}\geq 0.080 \quad (2)$$

where, in formula (2):

β: the average β angle (°) of the secondary recrystallized grains, t: the thickness (mm) of the steel sheet, R: the diameter (mm) of the secondary recrystallized grains, a: spacing (mm) between the plurality of linear grooves extending in the direction intersecting the rolling direction, w: the width (μm) of the grooves in the rolling direction, and d: the depth (mm) of the grooves.

3. The grain-oriented electrical steel sheet according to claim 1, wherein the steel sheet has a magnetic flux density B8 that is 1.91 T or more at a magnetizing force of 800 A/m, and the diameter R of the secondary recrystallized grains is 40 mm or more.

4. A wound core of a transformer, the wound core being formed from the grain-oriented electrical steel sheet according to claim 1.

5. A method for producing a wound core of a wound core transformer, the method allowing a building factor to be reduced, the building factor being obtained by dividing a value of iron loss of the wound core transformer by a value of iron loss of a grain-oriented electrical steel sheet used as a material of the wound core, the method comprising:

winding the grain-oriented electrical steel sheet to form the wound core, wherein:

a sheet thickness t of the grain-oriented electrical steel sheet and an iron loss deterioration ratio obtained when the grain-oriented electrical steel sheet is subjected to elliptic magnetization satisfy the following relations:

when the sheet thickness t≤0.20 mm, the iron loss deterioration ratio is 60% or less;

when 0.20 mm<the sheet thickness t<0.27 mm, the iron loss deterioration ratio is 55% or less; and when 0.27 mm≤the sheet thickness t, the iron loss deterioration ratio is 50% or less, and the iron loss deterioration ratio is defined by formula (1) below:

$$((W_A-W_B)/W_B)\times 100 \quad (1)$$

where, in formula (1):

$W_A$ is iron loss under 50 Hz elliptic magnetization of 1.7 T in a rolling direction and 0.6 T in a direction orthogonal to the rolling direction, and $W_B$ is iron loss under 50 Hz alternating magnetization of 1.7 T in the rolling direction.

6. The method for producing a wound core according to claim 5, wherein:

the steel sheet includes:

secondary recrystallized grains in the steel sheet, and a plurality of linear grooves on a surface of die steel sheet, the plurality of linear grooves extend in a direction intersecting the rolling direction, and a width w of the grooves in the rolling direction, a depth d of the grooves, a diameter R of the secondary recrystallized grains, and an average β angle of the secondary recrystallized grains satisfy the relation represented by the following formula (2):

[Math. 2]

$$\mathrm{Sin}\ \beta+4t/R+(w/a/\sqrt{2})\times(10d/t)\times 10^{-3}\geq 0.080 \quad (2)$$

where, in formula (2):

β: the average β angle (°) of the secondary recrystallized grains, t: the thickness (mm) of the steel sheet, R: the diameter (mm) of the secondary recrystallized grains, a: spacing (mm) between the plurality of linear grooves extending in the direction intersecting the rolling direction, w: the width (μm) of the grooves in the rolling direction, and d: the depth (mm) of the grooves.

7. The method for producing a wound core according to claim 5, wherein the steel sheet has a magnetic flux density B8 that 1.91 T or more at a magnetizing force of 800 A/m, and the diameter R of the secondary recrystallized grains is 40 mm or more.

8. The grain-oriented electrical steel sheet according to claim 2, wherein the steel sheet has a magnetic flux density B8 that is 1.91 T or more at a magnetizing force of 800 A/m, and the diameter R of the secondary recrystallized grains is 40 mm or more.

9. A wound core of a transformer, the wound core being formed from the grain-oriented electrical steel sheet according to claim 2.

10. A wound core of a transformer, the wound core being formed from the grain-oriented electrical steel sheet according to claim 3.

11. A wound core of a transformer, the wound core being formed from the grain-oriented electrical steel sheet according to claim 8.

12. The method for producing a wound core according to claim 6, wherein the steel sheet has a magnetic flux density B8 that is 1.91 T or more at a magnetizing force of 800 A/m, and the diameter R of the secondary recrystallized grains is 40 mm or more.

* * * * *